United States Patent
Lei et al.

(10) Patent No.: US 10,673,676 B2
(45) Date of Patent: Jun. 2, 2020

(54) TECHNIQUES AND APPARATUSES FOR MULTIPLEXING SCHEMES FOR MILLIMETER WAVE DOWNLINK SINGLE CARRIER WAVEFORMS

(71) Applicant: QUALCOMM Incorporated, San Diego, CA (US)

(72) Inventors: Jing Lei, San Diego, CA (US); Jing Sun, San Diego, CA (US); Tamer Kadous, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/030,348

(22) Filed: Jul. 9, 2018

(65) Prior Publication Data

US 2019/0021080 A1 Jan. 17, 2019

Related U.S. Application Data

(60) Provisional application No. 62/531,799, filed on Jul. 12, 2017.

(51) Int. Cl.
*H04L 27/36* (2006.01)
*H04B 7/0408* (2017.01)
(Continued)

(52) U.S. Cl.
CPC ......... *H04L 27/361* (2013.01); *H04B 7/0408* (2013.01); *H04B 7/0452* (2013.01);
(Continued)

(58) Field of Classification Search
CPC .. H04B 7/0408; H04B 7/0452; H04B 7/0617; H04B 7/10; H04L 27/361;
(Continued)

(56) References Cited

U.S. PATENT DOCUMENTS 5,734,647 A 3/1998 Yoshida et al.
6,317,420 B1 11/2001 Schiff
(Continued)

FOREIGN PATENT DOCUMENTS

| CN | 101615993 A | 12/2009 |
| WO | 2001001606 A1 | 1/2001 |
| WO | 2015062659 A1 | 5/2015 |

OTHER PUBLICATIONS

Joint Beam and Subband Resource Allocation with QoS Requirement for Millimeter Wave MIMO Systems Li-Hsiang Shen and Kai-Ten Feng Department of Electrical and Computer Engineering, National Chiao Tung University, Hsinchu, Taiwan Date Added to IEEE Xplore: May 11, 2017 (Year: 2017).*

(Continued)

*Primary Examiner* — Chi H Pham
*Assistant Examiner* — Weibin Huang
(74) *Attorney, Agent, or Firm* — Harrity & Harrity, LLP

(57) ABSTRACT

Certain aspects of the present disclosure generally relate to wireless communication. More particularly, aspects of the present disclosure provide multiplexing schemes which may be suited for the single carrier waveform. For example, some techniques and apparatuses described herein permit multiplexing of multiple, different data streams without destroying the single-carrier properties of the waveform. Additionally, or alternatively, some techniques and apparatuses described herein may provide unequal error protection, unequal bandwidth allocation, and/or the like as part of the multiplexing schemes. Examples of multiplexing schemes described herein include in-phase/quadrature (I/Q) multiplexing, superposition quadrature amplitude modulation (QAM) based at least in part on layered bit mapping, polarization division multiplexing of QAM with superposi- (Continued)

tion coding, and frequency division multiplexing using UE-specific beams.

20 Claims, 16 Drawing Sheets

(51) Int. Cl.
- *H04L 27/34* (2006.01)
- *H04B 7/0452* (2017.01)
- *H04B 7/06* (2006.01)
- *H04L 27/26* (2006.01)
- *H04B 7/10* (2017.01)
- *H04L 27/38* (2006.01)
- *H04W 16/28* (2009.01)
- *H04W 72/04* (2009.01)
- *H04J 14/06* (2006.01)
- *H04L 5/00* (2006.01)
- *H04J 3/02* (2006.01)

(52) U.S. Cl.
CPC ............. *H04B 7/0617* (2013.01); *H04B 7/10* (2013.01); *H04L 27/2636* (2013.01); *H04L 27/3488* (2013.01); *H04L 27/362* (2013.01); *H04L 27/38* (2013.01); *H04W 16/28* (2013.01); *H04W 72/046* (2013.01); *H04J 3/02* (2013.01); *H04J 14/06* (2013.01); *H04L 5/001* (2013.01); *H04L 5/005* (2013.01)

(58) Field of Classification Search
CPC ............. H04L 27/2636; H04L 27/3488; H04L 27/362; H04L 27/38; H04W 16/28; H04W 72/046
See application file for complete search history.

(56) References Cited

U.S. PATENT DOCUMENTS

| | | | |
|---|---|---|---|
| 8,976,838 B2 | 3/2015 | Jaeckel et al. | |
| 9,735,940 B1 * | 8/2017 | Bakr | H04L 5/0053 |
| 10,148,481 B2 * | 12/2018 | Perotti | H04L 1/0003 |
| 10,153,813 B2 * | 12/2018 | Li | H04W 24/10 |
| 2002/0141487 A1 | 10/2002 | Bradley | |
| 2007/0268959 A1 | 11/2007 | Bi et al. | |
| 2008/0297415 A1 * | 12/2008 | Berens | H04J 11/003 |
| | | | 342/372 |
| 2011/0075711 A1 | 3/2011 | Hasegawa | |
| 2011/0080972 A1 | 4/2011 | Xi et al. | |
| 2014/0010170 A1 * | 1/2014 | Das | H04L 5/0094 |
| | | | 370/329 |
| 2014/0064335 A1 | 3/2014 | Breun et al. | |
| 2016/0088641 A1 * | 3/2016 | Kwon | H04W 72/085 |
| | | | 370/329 |
| 2018/0092032 A1 * | 3/2018 | Choi | H04W 74/085 |
| 2019/0020527 A1 | 1/2019 | Lei et al. | |
| 2019/0020528 A1 | 1/2019 | Lei et al. | |
| 2019/0020529 A1 | 1/2019 | Lei et al. | |

OTHER PUBLICATIONS

Caili G., et al., "Advances on Exploiting Polarization in Wireless Communications: Channels, Technologies, and Applications", IEEE Communications Surveys & Tutorials, vol. 19, No. 1, Sep. 7, 2016, XP011641663, pp. 125-166.

Fay L., et al., "An Overview of the ATSC 3.0 Physical Layer Specification," IEEE Transactions on Broadcasting, IEEE Service Center, Piscataway, NJ, US, vol. 62, No. 1, Mar. 1, 2016 (Mar. 1, 2016), pp. 159-171, XP011608948, ISSN: 0018-9316, DOI: 10.1109/TBC.2015.2505417.

Homa H., et al., "Physical Layer of Frames Mode 2—Wideband CDMA," VTC-98. 48th. IEEE Vehicular Technology Conference. Ottawa, Canada, May 18-21, 1998; IEEE Vehicular Technology Conference, New York, NY: IEEE, vol. Conf. 48, May 18, 1998, pp. 978-982, XP000895046.

International Search Report and Written Opinion—PCT/US2018/041417—ISA/EPO—dated Sep. 25, 2018.

Kenichi H., "NOMA for Future Cellular Systems," 84th Vehicular Technology Conference (VTC-Fall), Sep. 18, 2016, pp. 1-5, XP033078935, [retrieved on Mar. 17, 2017].

Samsung: "Downlink ACK/NACK Transmit Diversity," 3GPP Draft; R1-073099 DL ACK TXD, 3rd Generation Partnership Project (3GPP), Mobile Competence Centre; 650, Route Des Lucioles; F-06921 Sophia-Antipolis Cedex; France, vol. RAN WG1, No. Orlando, USA; Jun. 20, 2007, Jun. 20, 2007, XP050106751, 3 pages, [retrieved on Jun. 20, 2007].

Shen L.H., et al., "Joint Beam and Subband Resource Allocation with QoS Requirement for Millimeter Wave MIMO Systems", 2017 IEEE Wireless Communications and Networking Conference (WCNC), IEEE, Mar. 19, 2017 (Mar. 19, 2017), XP033095812, pp. 1-6.

Yu C., et al., "Device Cooperation-assisted Scalable Video Multicast with Heterogeneous QoE Guarantees," 11th International Symposium on Wireless Communications Systems (ISWCS), Aug. 26, 2014, pp. 733-738, XP032666738, [retrieved on Oct. 21, 2014].

Zhao H., et al., "Hierarchical Modulation with Vector Rotation for Multimedia Broadcasting," GLOBECOM Workshops (GC WKSHPS), IEEE, Dec. 6, 2010, pp. 888-892, XP031859346.

* cited by examiner

US 10,673,676 B2

TECHNIQUES AND APPARATUSES FOR MULTIPLEXING SCHEMES FOR MILLIMETER WAVE DOWNLINK SINGLE CARRIER WAVEFORMS

CROSS-REFERENCE TO RELATED APPLICATIONS UNDER 35 U.S.C. § 119

This application claims priority to Provisional Patent Application No. 62/531,799, filed on Jul. 12, 2017, entitled "TECHNIQUES AND APPARATUSES FOR MULTIPLEXING SCHEMES FOR MILLIMETER WAVE DOWNLINK SINGLE CARRIER WAVEFORMS" which is hereby expressly incorporated by reference herein.

INTRODUCTION

Aspects of the present disclosure generally relate to wireless communication, and more particularly to techniques and apparatuses for multiplexing schemes for millimeter wave (mm Wave) downlink single carrier (SC) waveforms.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method for wireless communication performed by a transmitter device may include receiving a first data stream and a second data stream; modulating the first data stream to create a first modulated data stream; modulating the second data stream to create a second modulated data stream; and multiplexing the first modulated data stream and the second modulated data stream into a symbol using in-phase and quadrature carriers.

In some aspects, a transmitter device for wireless communication may include a memory and one or more processors configured to receive a first data stream and a second data stream; modulate the first data stream to create a first modulated data stream; modulate the second data stream to create a second modulated data stream; and multiplex the first modulated data stream and the second modulated data stream into a symbol using in-phase and quadrature carriers.

In some aspects, a non-transitory computer-readable medium may store one or more instructions for wireless communication. The one or more instructions, when executed by one or more processors of a transmitter device, may cause the one or more processors to receive a first data stream and a second data stream; modulate the first data stream to create a first modulated data stream; modulate the second data stream to create a second modulated data stream; and multiplex the first modulated data stream and the second modulated data stream into a symbol using in-phase and quadrature carriers.

In some aspects, an apparatus for wireless communication may include means for receiving a first data stream and a second data stream; means for modulating the first data stream to create a first modulated data stream; means for modulating the second data stream to create a second modulated data stream; and means for multiplexing the first modulated data stream and the second modulated data stream into a symbol using in-phase and quadrature carriers.

In some aspects, a method for wireless communication performed by a recipient device may include receiving a signal having an in-phase component and a quadrature component; identifying at least one symbol pertinent to the recipient device (e.g., based at least in part on a prepended signature sequence specific to the recipient device), wherein the at least one symbol is identified from at least one of the in-phase component or the quadrature component; and demodulating the at least one symbol.

In some aspects, a recipient device for wireless communication may include a memory and one or more processors configured to receive a signal having an in-phase component and a quadrature component; identify at least one symbol pertinent to the recipient device, wherein the at least one symbol is identified from at least one of the in-phase component or the quadrature component; and demodulate the at least one symbol.

In some aspects, a non-transitory computer-readable medium may store one or more instructions for wireless communication. The one or more instructions, when executed by one or more processors of a recipient device, may cause the one or more processors to receive a signal having an in-phase component and a quadrature component; identify at least one symbol pertinent to the recipient device, wherein the at least one symbol is identified from at least one of the in-phase component or the quadrature component; and demodulate the at least one symbol.

In some aspects, an apparatus for wireless communication may include means for receiving a signal having an in-phase component and a quadrature component; means for identifying at least one symbol pertinent to the apparatus, wherein the at least one symbol is identified from at least one of the in-phase component or the quadrature component; and means for demodulating the at least one symbol.

In some aspects, a method for wireless communication may include receiving a plurality of data streams; mapping sets of data streams, of the plurality of data streams, to respective sets of bit layers of a plurality of bit layers, wherein each bit layer, of the plurality of bit layers, corresponds to a binary expansion value that is generated based at least in part on a quadrature amplitude modulation (QAM) constellation; and transmitting a signal including the plurality of bit layers.

In some aspects, a transmitter device for wireless communication may include a memory and one or more processors configured to receive a plurality of data streams; map sets of data streams, of the plurality of data streams, to respective sets of bit layers of a plurality of bit layers, wherein each bit layer, of the plurality of bit layers, corresponds to a binary expansion value that is generated based at least in part on a QAM constellation; and transmit a signal including the plurality of bit layers. In some aspects, the signal may identify the assignment of bit layers to user devices or recipients.

In some aspects, a non-transitory computer-readable medium may store one or more instructions for wireless communication. The one or more instructions, when executed by one or more processors of a recipient device, may cause the one or more processors to receive a plurality of data streams; map sets of data streams, of the plurality of data streams, to respective sets of bit layers of a plurality of bit layers, wherein each bit layer, of the plurality of bit layers, corresponds to a binary expansion value that is generated based at least in part on a QAM constellation; and transmit a signal including the plurality of bit layers.

In some aspects, an apparatus for wireless communication may include means for receiving a plurality of data streams; means for mapping sets of data streams, of the plurality of data streams, to respective sets of bit layers of a plurality of bit layers, wherein each bit layer, of the plurality of bit layers, corresponds to a binary expansion value that is generated based at least in part on a QAM constellation; and means for transmitting a signal including the plurality of bit layers.

In some aspects, a method for wireless communication performed by a recipient device may include receiving a signal including a plurality of bit layers, wherein the plurality of bit layers is generated based at least in part on a QAM constellation; identifying at least one relevant bit layer, of the plurality of bit layers, that is relevant to the recipient device; and determining a data stream based at least in part on the at least one relevant bit layer.

In some aspects, a recipient device for wireless communication may include a memory and one or more processors configured to receive a signal including a plurality of bit layers, wherein the plurality of bit layers is generated based at least in part on a QAM constellation; identify at least one relevant bit layer, of the plurality of bit layers, that is relevant to the recipient device; and determine a data stream based at least in part on the at least one relevant bit layer.

In some aspects, a non-transitory computer-readable medium may store one or more instructions for wireless communication. The one or more instructions, when executed by one or more processors of a recipient device, may cause the one or more processors to receive a signal including a plurality of bit layers, wherein the plurality of bit layers is generated based at least in part on a QAM constellation; identify at least one relevant bit layer, of the plurality of bit layers, that is relevant to the recipient device; and determine a data stream based at least in part on the at least one relevant bit layer.

In some aspects, an apparatus for wireless communication may include means for receiving a signal including a plurality of bit layers, wherein the plurality of bit layers is generated based at least in part on a QAM constellation; means for identifying at least one relevant bit layer, of the plurality of bit layers, that is relevant to the apparatus; and means for determining a data stream based at least in part on the at least one relevant bit layer.

In some aspects, a method for wireless communication performed by a transmitter device may include performing a modulation technique with regard to at least two data streams to generate at least two modulated data streams corresponding to the at least two data streams; applying respective polarization patterns to the at least two modulated data streams; and transmitting, as a multiplexed signal after the respective polarization patterns are applied, the at least two modulated data streams.

In some aspects, a transmitter device for wireless communication may include a memory and one or more processors configured to perform a modulation technique with regard to at least two data streams to generate at least two modulated data streams corresponding to the at least two data streams; apply respective polarization patterns to the at least two modulated data streams; and transmit, as a multiplexed signal after the respective polarization patterns are applied, the at least two modulated data streams.

In some aspects, a non-transitory computer-readable medium may store one or more instructions for wireless communication. The one or more instructions, when executed by one or more processors of a transmitter device, may cause the one or more processors to perform a modulation technique with regard to at least two data streams to generate at least two modulated data streams corresponding to the at least two data streams; apply respective polarization patterns to the at least two modulated data streams; and transmit, as a multiplexed signal after the respective polarization patterns are applied, the at least two modulated data streams.

In some aspects, an apparatus for wireless communication may include means for performing a modulation technique with regard to at least two data streams to generate at least two modulated data streams corresponding to the at least two data streams; means for applying respective polarization patterns to the at least two modulated data streams; and means for transmitting, as a multiplexed signal after the respective polarization patterns are applied, the at least two modulated data streams.

In some aspects, a method for wireless communication performed by a recipient device may include receiving a multiplexed signal including at least two modulated data streams associated with respective polarization patterns, wherein the respective polarization patterns are applied using respective polarized antennas of a transmitter device; and obtaining data from a relevant data stream of the at least two modulated data streams, wherein at least one other data stream of the at least two modulated data streams is filtered based at least in part on at least one of the respective polarization patterns.

In some aspects, a recipient device for wireless communication may include a memory and one or more processors configured to receive a multiplexed signal including at least two modulated data streams associated with respective polarization patterns, wherein the respective polarization patterns are applied using respective polarized antennas of a transmitter device; and obtain data from a relevant data stream of the at least two modulated data streams, wherein at least one other data stream of the at least two modulated data streams is filtered based at least in part on at least one of the respective polarization patterns.

In some aspects, a non-transitory computer-readable medium may store one or more instructions for wireless communication. The one or more instructions, when executed by one or more processors of a recipient device, may cause the one or more processors to receive a multiplexed signal including at least two modulated data streams associated with respective polarization patterns, wherein the respective polarization patterns are applied using respective polarized antennas of a transmitter device; and obtain data from a relevant data stream of the at least two modulated data streams, wherein at least one other data stream of the at least two modulated data streams is filtered based at least in part on at least one of the respective polarization patterns.

In some aspects, an apparatus for wireless communication may include means for receiving a multiplexed signal including at least two modulated data streams associated with respective polarization patterns, wherein the respective polarization patterns are applied using respective polarized antennas of a transmitter device; and means for obtaining data from a relevant data stream of the at least two modulated data streams, wherein at least one other data stream of the at least two modulated data streams is filtered based at least in part on at least one of the respective polarization patterns.

In some aspects, a method of wireless communication performed by a transmitter device may include partitioning a bandwidth into multiple, non-overlapping sub-bands; assigning different sub-bands, of the multiple, non-overlapping sub-bands, to different recipient devices; and forming a plurality of respective beams for the different recipient devices, wherein each beam, of the plurality of respective beams, occupies a respective sub-band of the different sub-bands assigned to the different recipient devices.

In some aspects, a transmitter device for wireless communication may include a memory and one or more processors configured to partition a bandwidth into multiple, non-overlapping sub-bands; assign different sub-bands, of the multiple, non-overlapping sub-bands, to different recipient devices; and form a plurality of respective beams for the different recipient devices, wherein each beam, of the plurality of respective beams, occupies a respective sub-band of the different sub-bands assigned to the different recipient devices.

In some aspects, a non-transitory computer-readable medium may store one or more instructions for wireless communication. The one or more instructions, when executed by one or more processors of a transmitter device, may cause the one or more processors to partition a bandwidth into multiple, non-overlapping sub-bands; assign different sub-bands, of the multiple, non-overlapping sub-bands, to different recipient devices; and form a plurality of respective beams for the different recipient devices, wherein each beam, of the plurality of respective beams, occupies a respective sub-band of the different sub-bands assigned to the different recipient devices.

In some aspects, an apparatus for wireless communication may include means for partitioning a bandwidth into multiple, non-overlapping sub-bands; means for assigning different sub-bands, of the multiple, non-overlapping sub-bands, to different recipient devices; and means for forming a plurality of respective beams for the different recipient devices, wherein each beam, of the plurality of respective beams, occupies a respective sub-band of the different sub-bands assigned to the different recipient devices.

In some aspects, a method for wireless communication performed by a recipient device may include transmitting, to a transmitter device, information identifying a bandwidth capability of the recipient device, wherein the bandwidth capability corresponds to a sub-band of a beam bandwidth of the transmitter device; and receiving a recipient device-specific beam from the transmitter device, wherein the recipient device-specific beam is specific to the recipient device and occupies the sub-band, wherein the recipient device-specific beam is one of a plurality of non-overlapping recipient device-specific beams transmitted by the transmitter device in the beam bandwidth.

In some aspects, a recipient device for wireless communication may include a memory and one or more processors configured to transmit, to a transmitter device, information identifying a bandwidth capability of the recipient device, wherein the bandwidth capability corresponds to a sub-band of a beam bandwidth of the transmitter device; and receive a recipient device-specific beam from the transmitter device, wherein the recipient device-specific beam is specific to the recipient device and occupies the sub-band, wherein the recipient device-specific beam is one of a plurality of non-overlapping recipient device-specific beams transmitted by the transmitter device in the beam bandwidth.

In some aspects, a non-transitory computer-readable medium may store one or more instructions for wireless communication. The one or more instructions, when executed by one or more processors of a recipient device, may cause the one or more processors to transmit, to a transmitter device, information identifying a bandwidth capability of the recipient device, wherein the bandwidth capability corresponds to a sub-band of a beam bandwidth of the transmitter device; and receive a recipient device-specific beam from the transmitter device, wherein the recipient device-specific beam is specific to the recipient device and occupies the sub-band, wherein the recipient device-specific beam is one of a plurality of non-overlapping recipient device-specific beams transmitted by the transmitter device in the beam bandwidth.

In some aspects, an apparatus for wireless communication may include means for transmitting, to a transmitter device, information identifying a bandwidth capability of the apparatus, wherein the bandwidth capability corresponds to a sub-band of a beam bandwidth of the transmitter device; and receiving an apparatus-specific beam from the transmitter device, wherein the apparatus-specific beam is specific to the apparatus and occupies the sub-band, wherein the apparatus-specific beam is one of a plurality of non-overlapping apparatus-specific beams transmitted by the transmitter device in the beam bandwidth.

Aspects generally include a method, apparatus, system, computer program product, non-transitory computer-readable medium, base station, user equipment, wireless communication device, transmitter device, recipient device, and processing system as substantially described herein with reference to and as illustrated by the accompanying specification and drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
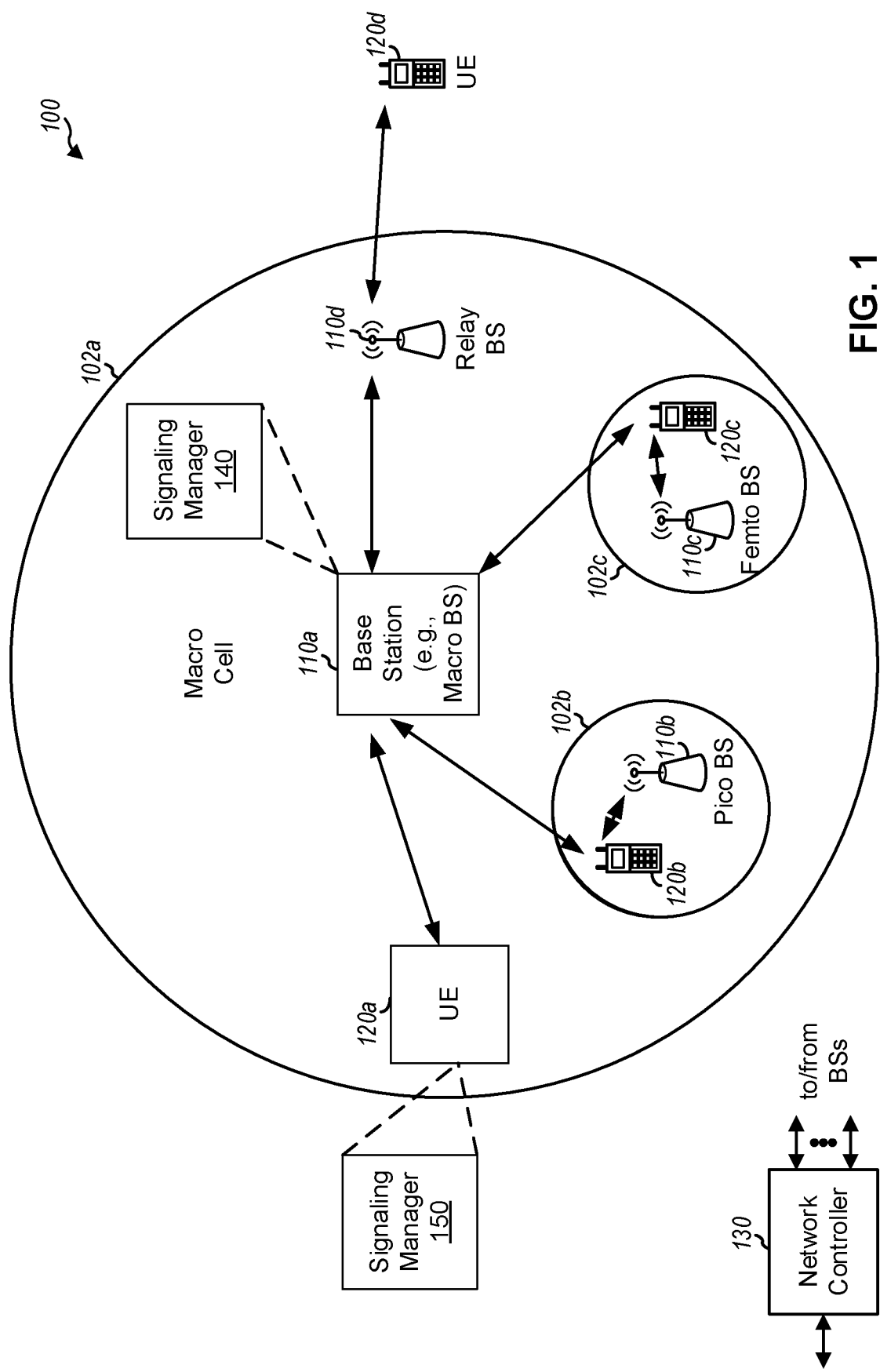
FIG. 1 is a block diagram conceptually illustrating an example of a wireless communication network, in accordance with various aspects of the present disclosure.

A transmitter device (e.g., a base station or UE) may generate signals to convey data to recipient devices (e.g., other base stations or UEs) using a multiplexing scheme. For example, the transmitter device may combine data streams for one or more recipient devices into a single data stream or signal using a multiplexing scheme. Examples of multiplexing schemes may include frequency division multiplexing (FDM) (e.g., wherein system spectrum is partitioned into non-overlapping sub-bands allocated to different users), code division multiplexing (CDM) (e.g., wherein orthogonal or quasi-orthogonal spreading codes are assigned to different users), time division multiplexing (TDM) (e.g., wherein different users are scheduled to transmit in different time slots), and space division multiplexing (SDM) (e.g., wherein different, spatially separable antenna beams are formed for different users).

With the advent of 5G/NR, larger frequency bandwidths have been allocated, especially for mm Wave transmission. Radio frequency (RF) constraints and propagation properties that are unique to the mm Wave may introduce new design challenges for cellular networks. One such design challenge is the usage of a single carrier (SC) waveform. Compared to OFDM, a SC waveform has lower peak to average power ratio (PAPR), which leads to benefits in power efficiency, link budget enhancement, and low-complexity design. However, traditional multiplexing schemes (e.g., TDM, CDM, FDM, SDM, etc.) may not be fully suited to the SC waveform, and/or may not provide sufficient flexibility with regard to unequal error protection, unequal bandwidth allocation, and/or the like.

Some techniques and apparatuses described herein provide multiplexing schemes which may be suited for the SC waveform. For example, some techniques and apparatuses described herein permit multiplexing of multiple, different data streams without destroying the single-carrier properties of the waveform. Additionally, or alternatively, some techniques and apparatuses described herein may provide unequal error protection, unequal bandwidth allocation, and/or the like as part of the multiplexing schemes. Examples of multiplexing schemes described herein include in-phase/ quadrature (I/Q) multiplexing, superposition QAM based at least in part on layered bit mapping, polarization division multiplexing of QAM with superposition coding, and FDM using UE-specific beams, as described in connection with FIGS. 5, 6, 7, and 8, respectively. These multiplexing schemes may preserve the SC waveform while enabling unequal error protection, unequal bandwidth allocation, and/ or the like.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110*a*, BS 110*b*, BS 110*c*, and BS 110*d*) and other network entities. A BS is an entity that communicates with user equipment (UEs) and may also be referred to as a base station, a NR BS, a Node B, a gNB, a 5G NB, an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station may also be referred to as a relay BS, a relay base station, a relay, etc.

Wireless network 100 may be a heterogeneous network that includes BSs of different types, e.g., macro BSs, pico BSs, femto BSs, relay BSs, etc. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

BS 110 may include a signaling manager 140. In some aspects, signaling manager 140 may perform operations related to signaling of the BS 110 (e.g., modulation, multiplexing, etc.). For example, signaling manager 140 may receive a first data stream and a second data stream; may modulate the first data stream to create a first modulated data stream; may modulate the second data stream to create a second modulated data stream; and may multiplex the first modulated data stream and the second modulated data stream into a symbol using in-phase and quadrature carriers. Additionally, or alternatively, signaling manager 140 may receive a plurality of data streams; may map sets of data streams, of the plurality of data streams, to respective sets of bit layers of a plurality of bit layers, wherein each bit layer, of the plurality of bit layers, corresponds to a binary expansion value that is generated based at least in part on a quadrature amplitude modulation (QAM) constellation; and may transmit a signal including the plurality of bit layers. Additionally, or alternatively, signaling manager 140 may perform a modulation technique with regard to at least two data streams to generate at least two modulated data streams corresponding to the at least two data streams; may apply respective polarization patterns to the at least two modulated data streams; and may transmit, as a multiplexed signal after the respective polarization patterns are applied, the at least two modulated data streams. Additionally, or alternatively, signaling manager 140 may partition a bandwidth into multiple, non-overlapping sub-bands; may assign different sub-bands, of the multiple, non-overlapping sub-bands, to different wireless communication devices; and may form a plurality of respective beams for the different wireless communication devices, wherein each beam, of the plurality of respective beams, occupies a respective sub-band of the different sub-bands assigned to the different wireless communication devices. Additionally, or alternatively, signaling manager 140 may perform similar or other operations described herein.

UE 120 may include a signaling manager 150. In some aspects, signaling manager 150 may perform operations related to signaling received by the UE 120 (e.g., demodulation, demultiplexing, etc.). For example, signaling manager 150 may receive a signal having an in-phase component and a quadrature component; may identify at least one symbol pertinent to UE 120, wherein the at least one symbol is identified from at least one of the in-phase component or the quadrature component; and may demodulate the at least one symbol. Additionally, or alternatively, signaling manager 150 may receive a signal including a plurality of bit layers, wherein the plurality of bit layers is generated based at least in part on a QAM constellation; may identify at least one relevant bit layer, of the plurality of bit layers, that is relevant to the UE 120; and may determine a data stream based at least in part on the at least one relevant bit layer. Additionally, or alternatively, signaling manager 150 may receive a multiplexed signal including at least two modulated data streams associated with respective polarization patterns, wherein the respective polarization patterns are applied using respective polarized antennas; and may obtain data from a relevant data stream of the at least two modulated data streams, wherein at least one other data stream of the at least two modulated data streams is filtered based at least in part on at least one of the respective polarization patterns. Additionally, or alternatively, signaling manager 150 may transmit, to a base station, information identifying a bandwidth capability of the UE 120, wherein the bandwidth capability corresponds to a sub-band of a beam bandwidth of the base station; and may receive a user equipment-specific beam from the base station, wherein the user equipment-specific beam is specific to the UE 120 device and occupies the sub-band, wherein the user equipment-specific beam is one of a plurality of non-overlapping user equipment-specific beams transmitted by the base station in the beam bandwidth. Additionally, or alternatively, signaling manager 150 may perform similar or other operations described herein.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing 120' that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
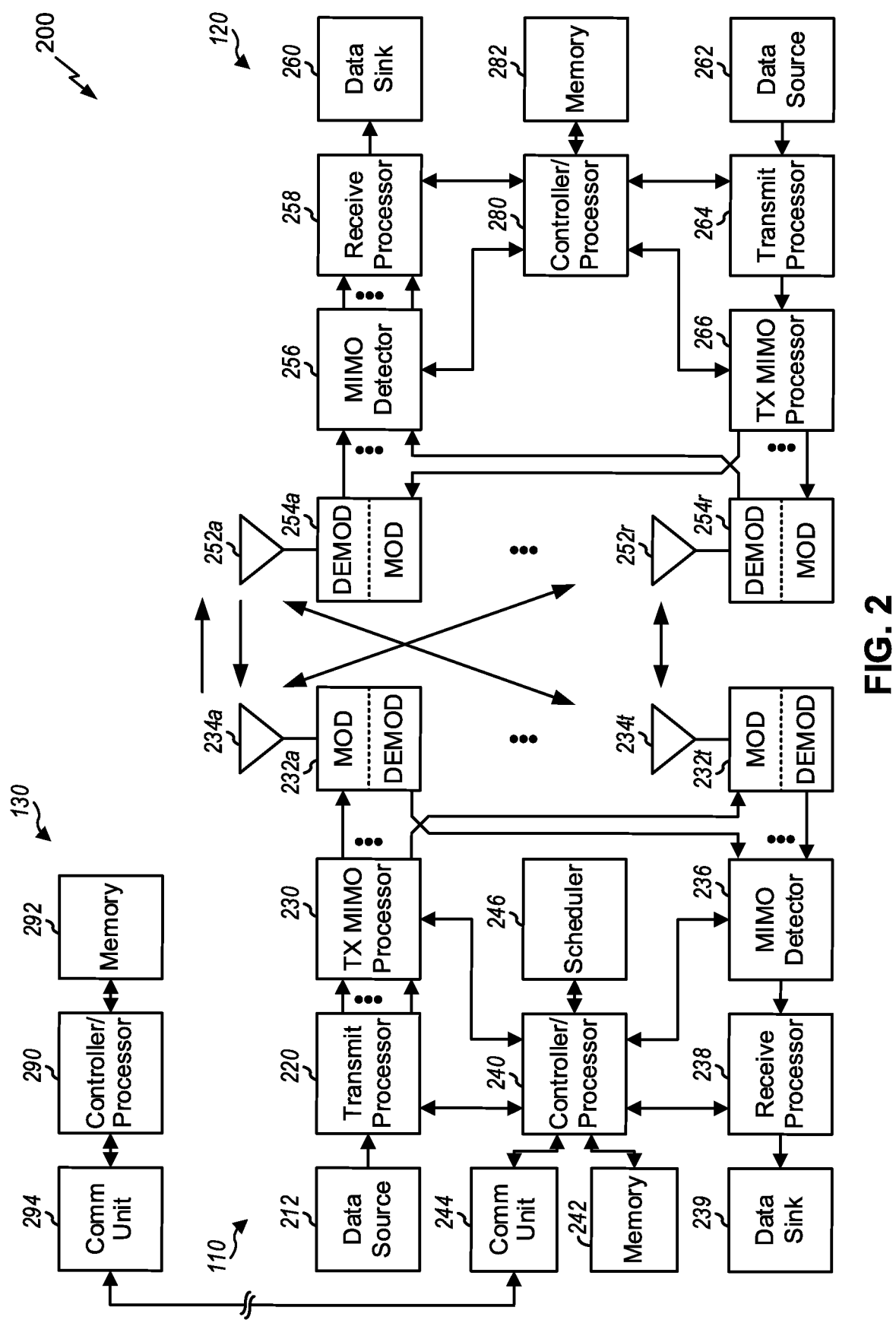
FIG. 2 shows a block diagram conceptually illustrating an example of a base station in communication with a user equipment (UE) in a wireless communication network, in accordance with various aspects of the present disclosure.

FIG. 2 shows a block diagram of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to certain aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. For example, the receive processor 258 may perform one or more of the operations described with regard to signaling manager 150, above. Additionally, or alternatively, the receive processor 258 may include means for performing one or more of the operations performed by signaling manager 150, above. A channel processor may determine reference signal received power (RSRP), received signal strength indicator (RSSI), reference signal received quality (RSRQ), channel quality indicator (CQI), etc.

On the uplink, at UE 120, a transmit processor 264 may receive and process data from a data source 262 and control information (e.g., for reports comprising RSRP, RSSI, RSRQ, CQI, etc.) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. For example, the receive processor 238 may perform one or more of the operations described with regard to signaling manager 140, above. Additionally, or alternatively, the receive processor 238 may include means for performing one or more of the operations performed by signaling manager 140, above. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controllers/processors 240 and 280 and/or any other component(s) in FIG. 2 may direct the operation at base station 110 and UE 120, respectively, to perform multiplexing schemes for millimeter wave (mm Wave) downlink single carrier (SC) waveforms. For example, controller/processor 280 and/or other processors and modules at UE 120, may perform or direct operations of UE 120 to perform multiplexing schemes for mm Wave downlink SC waveforms. For example, controller/processor 280 and/or other controllers/processors and modules at UE 120 may perform or direct operations of, for example, process 1000 of FIG. 10, process 1200 of FIG. 12, process 1400 of FIG. 14, process 1600 of FIG. 16, and/or other processes as described herein. Additionally, or alternatively, controller/processor 240 and/or other processors and modules at BS 110, may perform or direct operations of BS 110 to perform multiplexing schemes for mm Wave downlink SC waveforms. For example, controller/processor 240 and/or other controllers/processors and modules at BS 110 may perform or direct operations of, for example, process 900 of FIG. 9, process 1100 of FIG. 11, process 1300 of FIG. 13, process 1500 of FIG. 15, and/or other processes as described herein. In some aspects, one or more of the components shown in FIG. 2 may be employed to perform example process 900, example process 1000, example process 1100, example process 1200, example process 1300, example process 1400, example process 1500, example process 1600, and/or other processes for the techniques described herein. Memories 242 and 282 may store data and program codes for base station 110 and UE 120, respectively. A scheduler 246 may schedule UEs for data transmission on the downlink and/or uplink.

In some aspects, a recipient device (e.g., UE 120) may include means for receiving a signal having an in-phase component and a quadrature component; means for identifying at least one symbol pertinent to the UE 120; means for demodulating the at least one symbol; means for receiving a signal including a plurality of bit layers; means for identifying at least one relevant bit layer, of the plurality of bit layers, that is relevant to the UE 120; means for determining a data stream based at least in part on the at least one relevant bit layer; means for receiving a multiplexed signal including at least two modulated data streams associated with respective polarization patterns; means for obtaining data from a relevant data stream of the at least two modulated data streams; and/or the like. In some aspects, such means may include one or more components of UE 120 described in connection with FIG. 2.

In some aspects, a transmitter device (e.g., BS 110) may include means for receiving a first data stream and a second data stream; means for modulating the first data stream to create a first modulated data stream; means for modulating the second data stream to create a second modulated data stream; means for multiplexing the first modulated data stream and the second modulated data stream into a symbol using in-phase and quadrature carriers; means for adding a first signature to the first data stream and a second signature to the second data stream; means for receiving a plurality of data streams; means for mapping sets of data streams, of the plurality of data streams, to respective sets of bit layers of a plurality of bit layers; means for transmitting a signal including the plurality of bit layers; means for assigning the respective sets of bit layers to one or more entities associated with the plurality of data streams; means for performing a modulation technique with regard to at least two data streams to generate at least two modulated data streams corresponding to the at least two data streams; means for applying respective polarization patterns to the at least two modulated data streams; means for transmitting, as a multiplexed signal after the respective polarization patterns are applied, the at least two modulated data streams; means for partitioning a bandwidth into multiple, non-overlapping sub-bands; means for assigning different sub-bands, of the multiple, non-overlapping sub-bands, to different recipient devices; means for forming a plurality of respective beams for the different recipient devices; and/or the like. In some aspects, such means may include one or more components of BS 110 described in connection with FIG. 2.

As indicated above, FIG. 2 is provided merely as an example. Other examples are possible and may differ from what was described with regard to FIG. 2.

Figure 3:
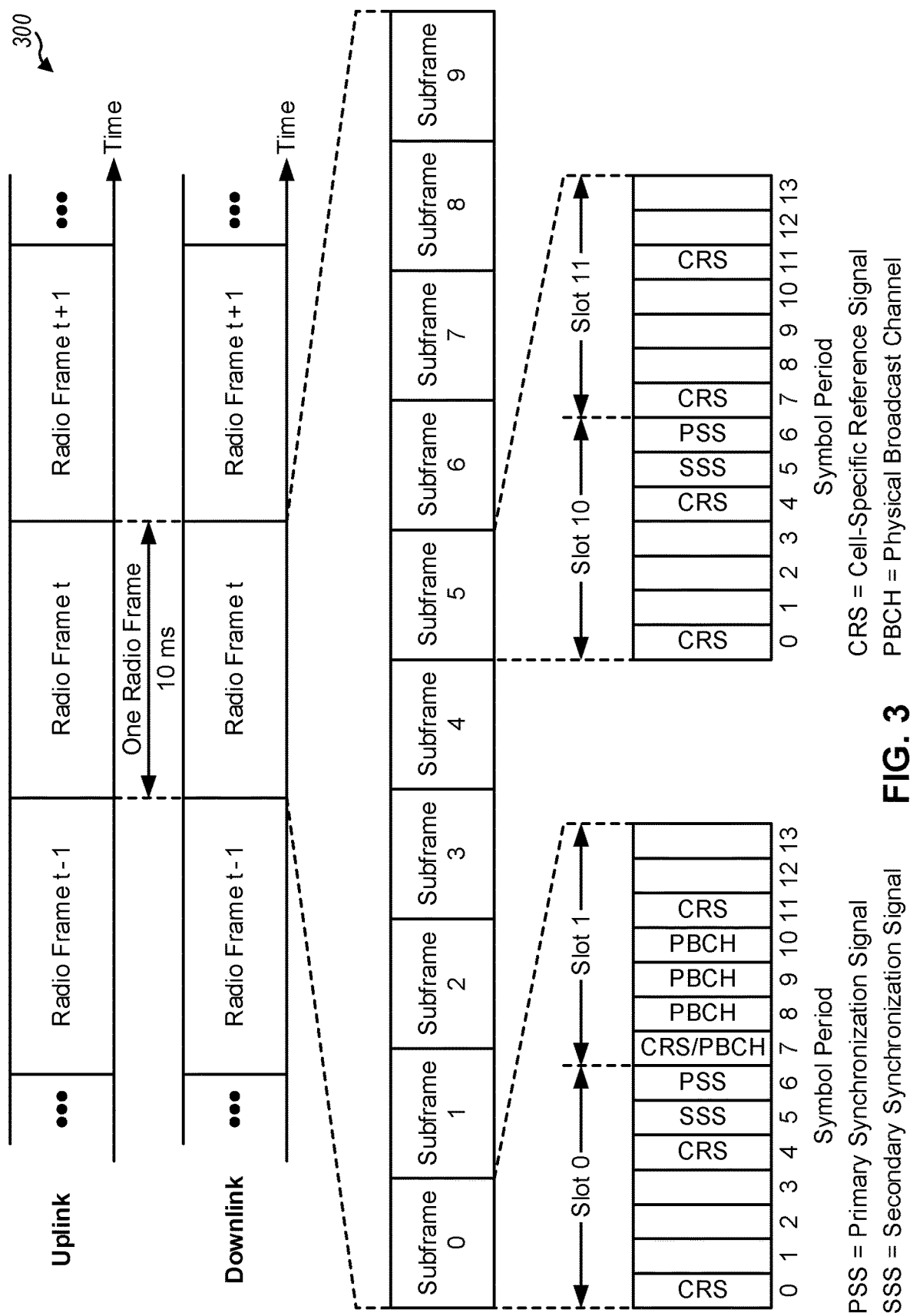
FIG. 3 is a block diagram conceptually illustrating an example of a frame structure in a wireless communication network, in accordance with various aspects of the present disclosure.

FIG. 3 shows an example frame structure 300 for frequency division duplexing (FDD) in a telecommunications system (e.g., LTE). The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 3) or six symbol periods for an extended cyclic prefix. The 2L symbol periods in each subframe may be assigned indices of 0 through 2L−1.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol.

In certain telecommunications (e.g., LTE), a BS may transmit a primary synchronization signal (PSS) and a secondary synchronization signal (SSS) on the downlink in the center of the system bandwidth for each cell supported by the BS. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The BS may transmit a cell-specific reference signal (CRS) across the system bandwidth for each cell supported by the BS. The CRS may be transmitted in certain symbol periods of each subframe and may be used by the UEs to perform channel estimation, channel quality measurement, and/or other functions. The BS may also transmit a physical broadcast channel (PBCH) in symbol periods 0 to 3 in slot 1 of certain radio frames. The PBCH may carry some system information. The BS may transmit other system information such as system information blocks (SIBs) on a physical downlink shared channel (PDSCH) in certain subframes. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe.

In other systems (e.g., such NR or 5G systems), a Node B may transmit these or other signals in these locations or in different locations of the subframe. Additionally, or alternatively, the Node B may use different multiplexing schemes, such as the multiplexing schemes described elsewhere herein.

As indicated above, FIG. 3 is provided merely as an example. Other examples are possible and may differ from what was described with regard to FIG. 3.

Figure 4:
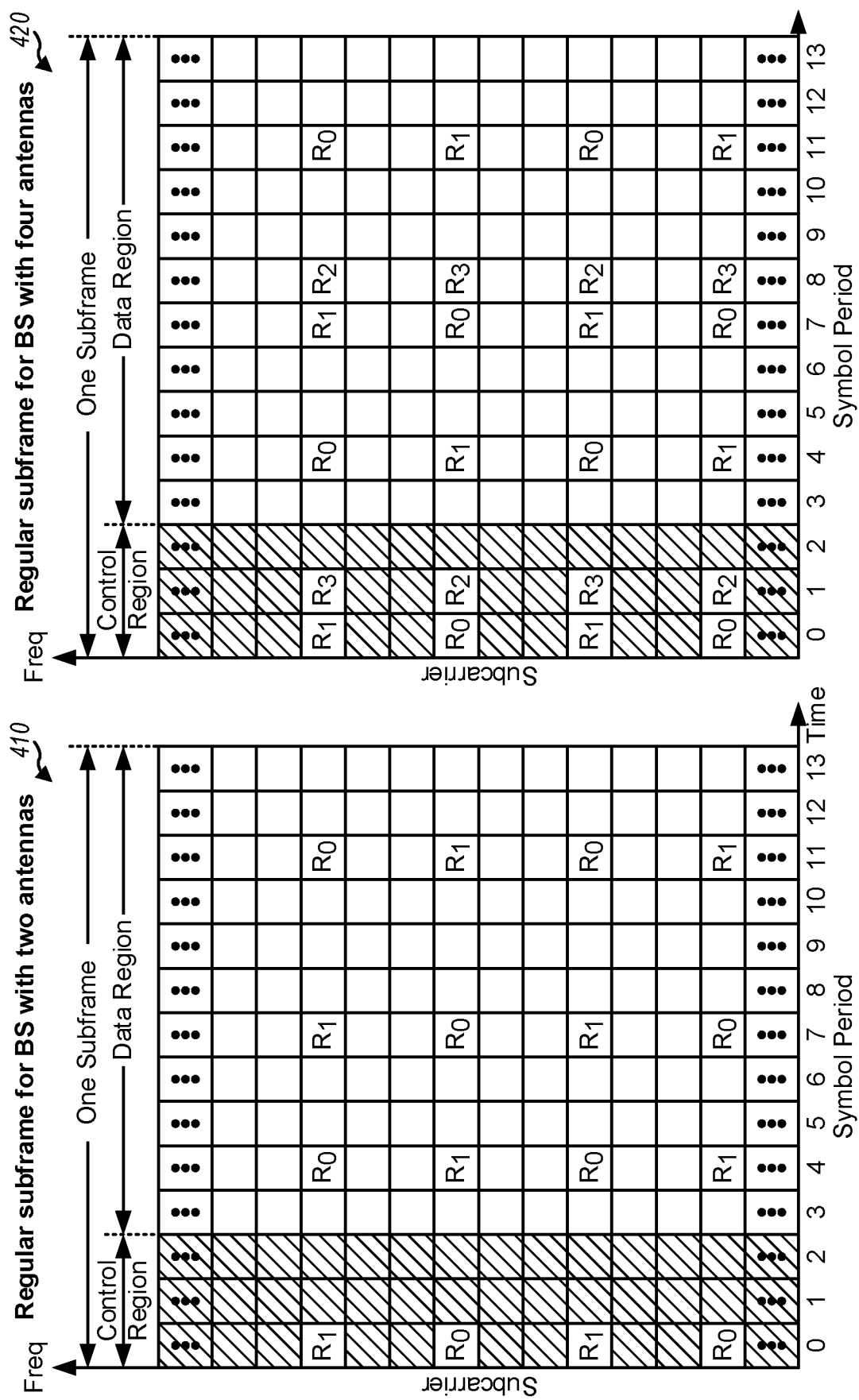
FIG. 4 is a block diagram conceptually illustrating two example subframe formats with the normal cyclic prefix, in accordance with various aspects of the present disclosure.

FIG. 4 shows two example subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7, and 11. A reference signal is a signal that is known a priori by a transmitter and a receiver and may also be referred to as a pilot signal. A CRS is a reference signal that is specific for a cell, e.g., generated based at least in part on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7, and 11 and from antennas 2 and 3 in symbol periods 1 and 8. For both subframe formats 410 and 420, a CRS may be transmitted on evenly spaced subcarriers, which may be determined based at least in part on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP Technical Specification 36.211, entitled "Evolved Universal Terrestrial Radio Access (E-UTRA); Physical Channels and Modulation," which is publicly available.

An interlace structure may be used for each of the downlink and uplink for FDD in certain telecommunications systems (e.g., LTE). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

The wireless network may support hybrid automatic retransmission request (HARQ) for data transmission on the downlink and uplink. For HARQ, a transmitter (e.g., a BS) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with LTE technologies, aspects of the present disclosure may be applicable with other wireless communication systems, such as NR or 5G technologies.

New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

A single component carrier bandwidth of 100 MHZ may be supported. NR resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data. UL and DL subframes for NR may be as described in more detail below with respect to FIGS. 7 and 8.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

The RAN may include a central unit (CU) and distributed units (DUs). A NR BS (e.g., gNB, 5G Node B, Node B, transmit receive point (TRP), access point (AP)) may correspond to one or multiple BSs. NR cells can be configured as access cells (ACells) or data only cells (DCells). For example, the radio access network (RAN) (e.g., a central unit or distributed unit) can configure the cells. DCells may be cells used for carrier aggregation or dual connectivity, but not used for initial access, cell selection/reselection, or handover. In some cases, DCells may not transmit synchronization signals. In some cases, DCells may transmit synchronization signals. NR BSs may transmit downlink signals to UEs indicating the cell type. Based at least in part on the cell type indication, the UE may communicate with the NR BS. For example, the UE may determine NR BSs to consider for cell selection, access, handover, and/or measurement based at least in part on the indicated cell type.

As indicated above, FIG. 4 is provided as an example. Other examples are possible and may differ from what was described with regard to FIG. 4.

Figure 5:
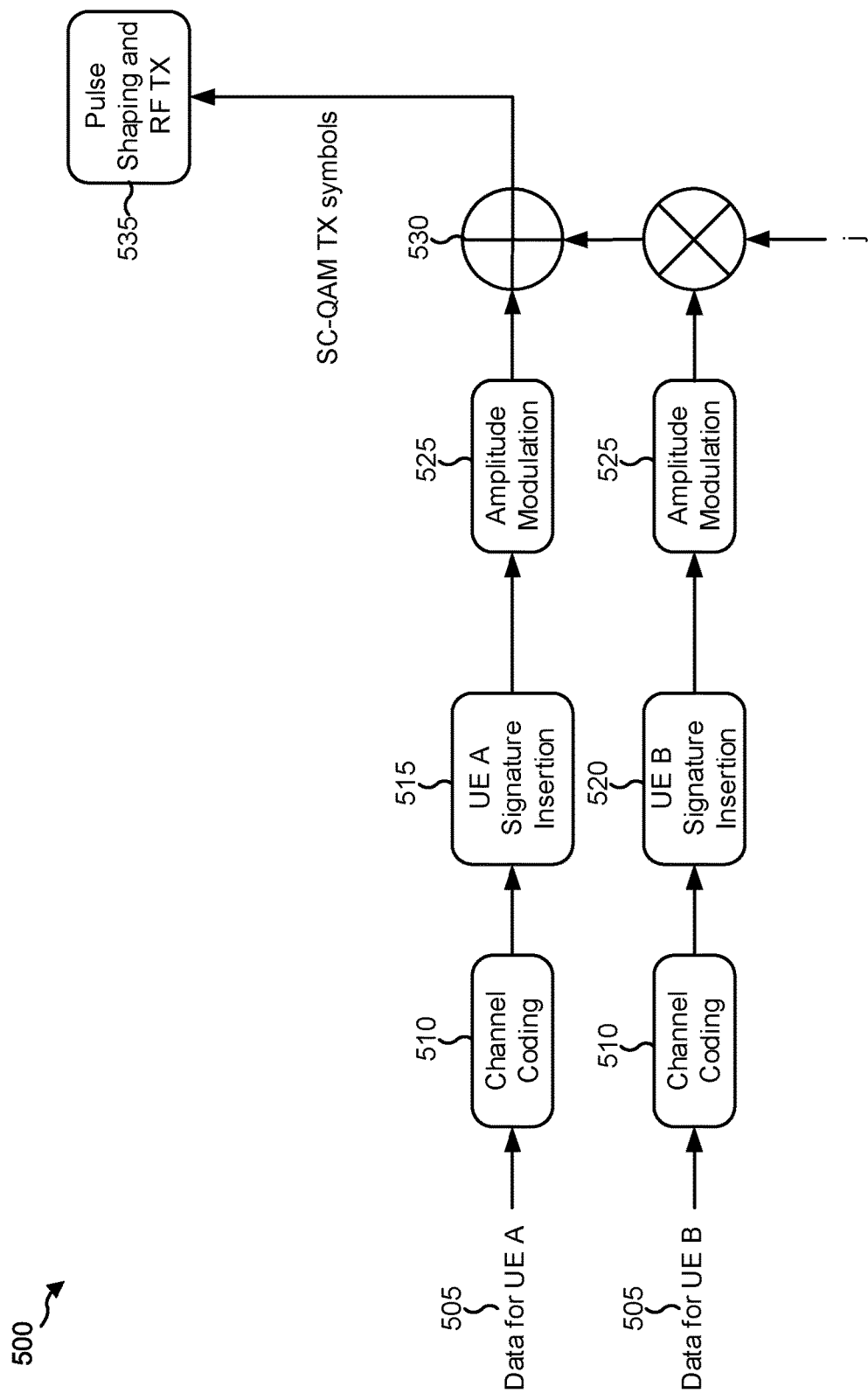
FIG. 5 is a diagram illustrating an example of in-phase/quadrature multiplexing, in accordance with various aspects of the present disclosure.

FIG. 5 is a diagram illustrating an example 500 of in-phase/quadrature multiplexing, in accordance with various aspects of the present disclosure. For the purpose of FIG. 5, assume that a transmitter device (e.g., a BS 110) is performing the operations shown in example 500. In some aspects, another device (e.g., UE 120) may perform one or more (or all) of the operations shown in example 500.

As shown in FIG. 5, and by reference number 505, the transmitter device may receive a first data stream for UE A (e.g., a recipient device such as a UE 120), and may receive a second data stream for UE B (e.g., another recipient device). In some aspects, the first data stream and/or the second data stream may be received from a higher layer of the transmitter device (e.g., after processing of the first data stream and/or the second data stream), from an external source, and/or the like. In some aspects, the data stream may include bit sets of information that are to be used to form respective symbols or parts of symbols. In some aspects, UE A may be a different UE than UE B. Additionally, or alternatively, UE A and UE B may be the same UE. For example, the first data stream and the second data stream may be different data streams destined to the same UE. In some aspects, the first data stream and/or the second data stream may be for a device other than a UE. Aspects described herein are not limited to multiplexing of data directed to UEs.

As shown by reference number 510, the transmitter device may perform channel coding on the first data stream and the second data stream. For example, the transmitter device may add a cyclic redundancy check (CRC), an error detection code, and/or the like. In some aspects, the transmitter device may perform rate matching to increase or decrease a code rate of the first data stream and/or the second data stream.

As shown by reference number 515, the transmitter device may insert a signature associated with UE A into the first data stream after channel coding is performed on the first data stream. The signature associated with UE A may include any information that identifies UE A or that is associated with UE A. In some aspects, the transmitter device may add the signature before a coded data set of the bit stream. In some aspects, the transmitter device may add the signature after a coded data set of the bit stream. As shown by reference number 520, the transmitter device may insert a signature associated with UE B into the second data stream after channel coding is performed on the second data stream. The signature associated with UE B may include any information that identifies UE B or that is associated with UE B. UE A and/or UE B may use the respective signatures to identify symbols, code words, or bit sets relevant to UE A and/or UE B.

As shown by reference number 525, the transmitter device may apply amplitude modulation to the first data stream and the second data stream. Thus, the transmitter device may generate a modulated first data stream and a modulated second data stream. In some aspects, the transmitter device may perform QAM on the first data stream and the second data stream.

As shown by reference number 530, the transmitter device may use an in-phase carrier and a quadrature carrier to multiplex the amplitude-modulated data streams into a single-carrier QAM (SC-QAM) symbol. Here, the quadrature carrier is used for the second data stream (denoted by the multiplication of the second data stream by j). Thus, an in-phase/quadrature (I/Q) multiplexed SC-QAM symbol is generated from the first data stream and the second data stream. The I/Q multiplexed SC-QAM symbol may preserve the SC properties of the waveform, which may improve PAPR of the waveform and therefore improve downlink performance of the transmitter device. As shown by reference number 535, the transmitter device may perform pulse shaping and/or may transmit the SC-QAM symbols. By performing pulse shaping, the transmitter device may further improve SC performance of the waveform.

In some aspects, the transmitter device may use TDM in conjunction with I/Q multiplexing to multiplex data streams for more than two UEs. As one example, for a first time frame $1 \le n \le T_{AB}$, the transmitter device may multiplex UEs A and B into QAM symbols $S_A(n)+jS_B(n)$. For a second time frame $1+T_{AB} \le n \le T_{AB}+T_{CD}$, the transmitter device may multiplex UEs C and D into QAM symbols $S_C(n)+jS_D(n)$. Of course, other TDM/I/Q multiplexing approaches are possible, and any combination of UEs, time frames, and TDM arrangements may be used.

As indicated above, FIG. 5 is provided as an example. Other examples are possible and may differ from what was described with respect to FIG. 5.

Figure 6:
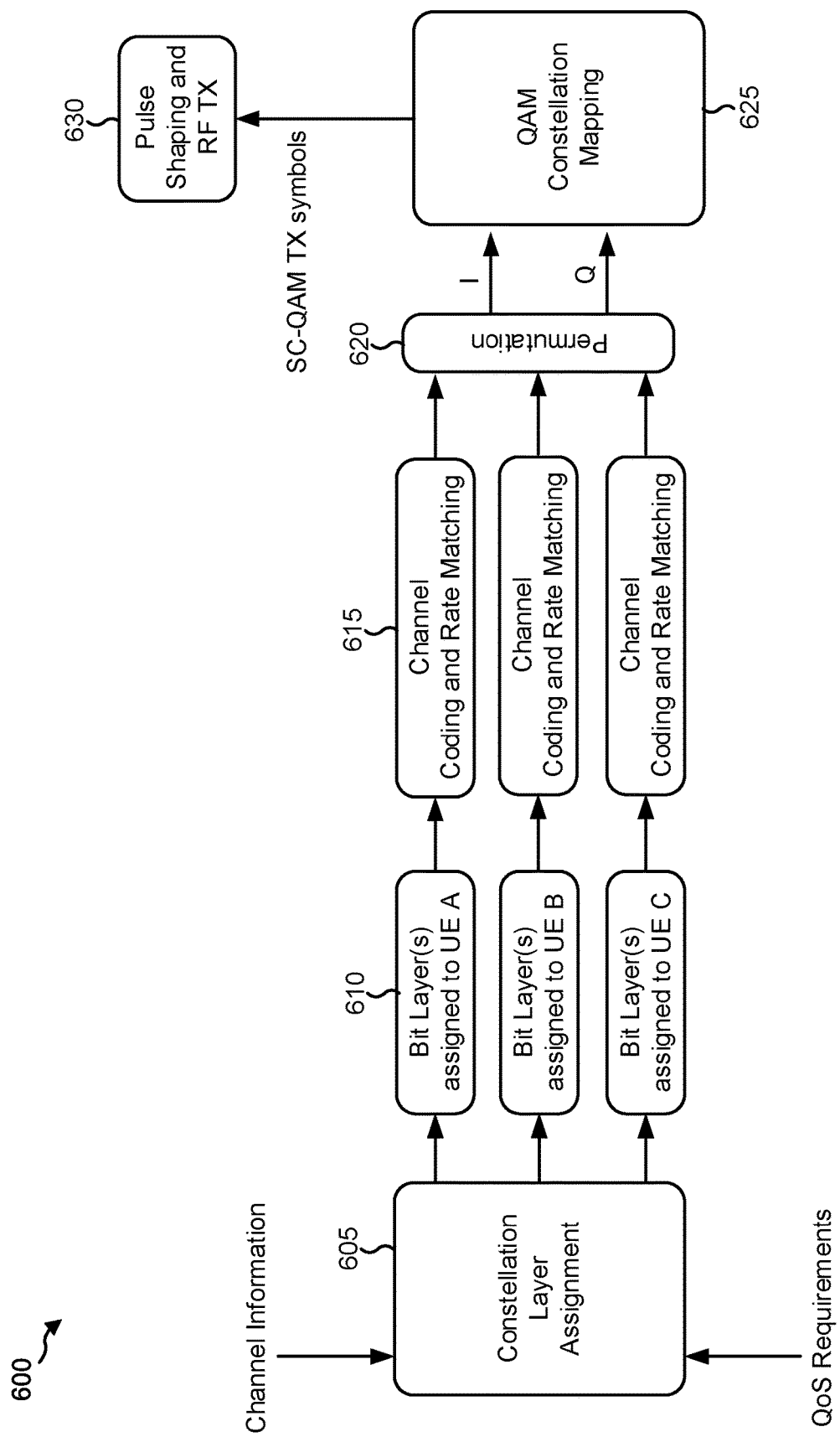
FIG. 6 is a diagram illustrating an example of superposition quadrature amplitude modulation (QAM) based at least in part on layered bit mapping, in accordance with various aspects of the present disclosure.

FIG. 6 is a diagram illustrating an example 600 of superposition QAM based at least in part on layered bit mapping, in accordance with various aspects of the present disclosure. For the purpose of FIG. 6, assume that a transmitter device (e.g., a BS 110) is performing the operations shown in example 600. In some aspects, another device (e.g., UE 120) may perform one or more (or all) of the operations shown in example 600.

FIG. 6 describes the mapping of data streams to bit layers that are generated using a binary expansion of a layered QAM constellation. For example, due to the high penetration loss and quasi-optical propagation of mm Wave, a mm Wave channel can be approximated by a binary expansion of the layered QAM constellation. To illustrate, assume that the transmitter device transmits a layered constellation S with M distinct layers. Each layer may be associated with a respective power level based at least in part on I and/or Q components that form each layer. For example, the magnitude levels on I and/or Q components may be shown or approximated by the following equation:

$$S \triangleq \sum_{m=1}^{M} D_m 2^m, \text{ where } D_m \in \{-1, 1\}$$

In the above equation, the layered QAM constellation S includes layers 1 through M. $2^m$ represents a power level of the corresponding layer m. Therefore, and as shown, higher layers (e.g., layers corresponding to I and/or Q values further from the origin of the layered QAM constellation) may be associated with higher transmit power. This may enable unequal error protection for UEs that are associated with different QoS requirements. Additionally, or alternatively, this may enable unequal error protection for different types of traffic, or based at least in part on any other criterion.

As a more particular example, consider a layered 64-QAM constellation. Each constellation point of a 64-QAM constellation X can be represented by a two-dimensional array $[X_I X_Q]$. $X_I$ and $X_Q$ represent the projection of X onto in-phase (I) and quadrature (Q) branches, respectively. Moreover, there are 8 distinct amplitude levels on both the I branch and the Q branch of the 64-QAM constellation X. Through binary expansion, the 8 amplitude levels can be represented by:

$$X_I = \sum_{m=0}^{2} B_I(m) 2^m, \text{ where } B_I(m) = \pm 1, \text{ and}$$

$$X_Q = \sum_{n=0}^{2} B_Q(n) 2^n, \text{ where } B_Q(n) = \pm 1, \text{ respectively.}$$

For the I branch, the 8 amplitude levels are mapped to a set of three bit layers given by $[B_I(0) \, B_I(1) \, B_I(2)]$. Similarly, for the Q branch, the 8 amplitude levels are mapped to another set of three bit layers given by $[B_Q(0) \, B_Q(1) \, B_Q(2)]$. Thus, there are in total 3+3=6 bit layers available for multiplexing. According to channel feedback, QoS requirements, and/or the like, the transmitter device can allocate a different combination of one or more bit layers to each UE, as described in more detail below.

As shown in FIG. 6, and by reference number 605, the transmitter device may assign sets of bit layers of a layered constellation to one or more UEs. Here, the transmitter device assigns sets of bit layers to UE A, UE B, and UE C, as described in more detail below. As shown, the transmitter device may assign a bit layer based at least in part on channel information. For example, when a UE reports channel information (e.g., channel state information (CSI) feedback and/or the like) indicating poor channel quality, the transmitter device may assign a layer associated with a higher transmission power. As further shown, the transmitter device may assign a bit layer based at least in part on a QoS requirement of a UE. For example, when the UE is associated with a high QoS requirement, the transmitter device may assign a bit layer associated with a higher transmission power. In some aspects, the transmitter device may assign a bit layer based at least in part on a combination of the channel information and the QoS requirement.

As shown by reference number 610, at least one bit layer may be assigned to each of UE A, UE B, and UE C. For example, assume that the transmitter device determines that downlink traffic is to be multiplexed and transmitted to UE A, UE B, and UE C. The transmitter device may assign at least one bit layer to UE A, UE B, and UE C to provide the downlink traffic. In some aspects, the transmitter device may assign a single bit layer (e.g., based at least in part on a QoS requirement, a priority class, a reliability requirement, a data rate, etc.). Additionally, or alternatively, the transmitter device may assign multiple bit layers (e.g., based at least in part on a QoS requirement, a priority class, a reliability requirement, a data rate, etc.).

In some aspects, the transmitter device may assign a bit layer based at least in part on a traffic type. For example, control data (e.g., a PDCCH, a physical uplink control channel (PUCCH), etc.) can be assigned to a more reliable bit layer or a bit layer associated with a higher power level than traffic data (e.g., payload data, a PDSCH, a physical uplink shared channel (PUSCH), etc.). This can be performed for the same UE or for different UEs. When two or more bit layers are assigned, the bit layers may or may not be adjacent to each other. In some aspects, the bit layers may be assigned based at least in part on a throughput function or utility function. For example, the transmitter device may maximize a throughput function or utility function by assigning the bit layers based at least in part on the channel feedback, QoS requirements, power levels of the bit layers, and/or the like.

As shown by reference number 615, the transmitter device may perform channel coding and rate matching for data streams associated with UE A, UE B, and UE C. For example, the transmitter device may add CRCs, error checking codes, and/or the like to the data streams. Additionally, or alternatively, the transmitter device may perform rate matching for one or more of the data streams. By performing rate matching, the transmitter device may improve resilience or reliability of the data streams. For example, the transmitter device may use stronger channel coding and/or a more resilient rate for information associated with a higher QoS requirement. As another example, the transmitter device may use stronger channel coding and/or a more resilient rate for information assigned to a bit layer associated with a lower power level to increase likelihood of successful reception of the information.

As shown by reference number 620, the transmitter device may perform permutation to prepare the data streams of UEs A, B, and C for mapping to the QAM constellation. For example, the transmitter device may modulate the data streams to particular amplitude levels with regard to I and Q components of the QAM constellation, so that the data streams can be mapped to the corresponding bit layers. Permutation may provide multi-user gain and/or diversity gain for the transmitted signal. In some aspects, permutation may be configured by the transmitter device (e.g., using radio resource control messaging, control information, such as downlink control information, and/or the like).

As shown by reference number 625, the transmitter device may perform QAM constellation mapping of the data streams. For example, the transmitter device may generate symbols according to a layered QAM constellation using the data streams of UEs A, B, and C (e.g., using respective I and Q carriers that are modulated according to the particular amplitude levels of the bit layers to which the data streams are to be mapped). As shown by reference number 630, the transmitter device may perform pulse shaping and/or may transmit an RF signal including the SC-QAM symbols generated as part of the QAM constellation mapping process.

In this way, the transmitter device multiplexes multiple, different data streams using different bit layers of a layered QAM constellation. By generating symbols using the different bit layers, the SC properties of the transmitted waveform are preserved. Furthermore, unequal error protection for the multiple, different data streams is enabled based at least in part on the different transmission power levels of the bit layers. These operations can be performed for a shared channel (e.g., data channel, PDSCH, PUSCH, etc.), a control channel (e.g., PDCCH, PUCCH, etc.), and/or a hybrid or combination of a shared channel and a control channel.

As indicated above, FIG. 6 is provided as an example. Other examples are possible and may differ from what was described with respect to FIG. 6.

Figure 7:
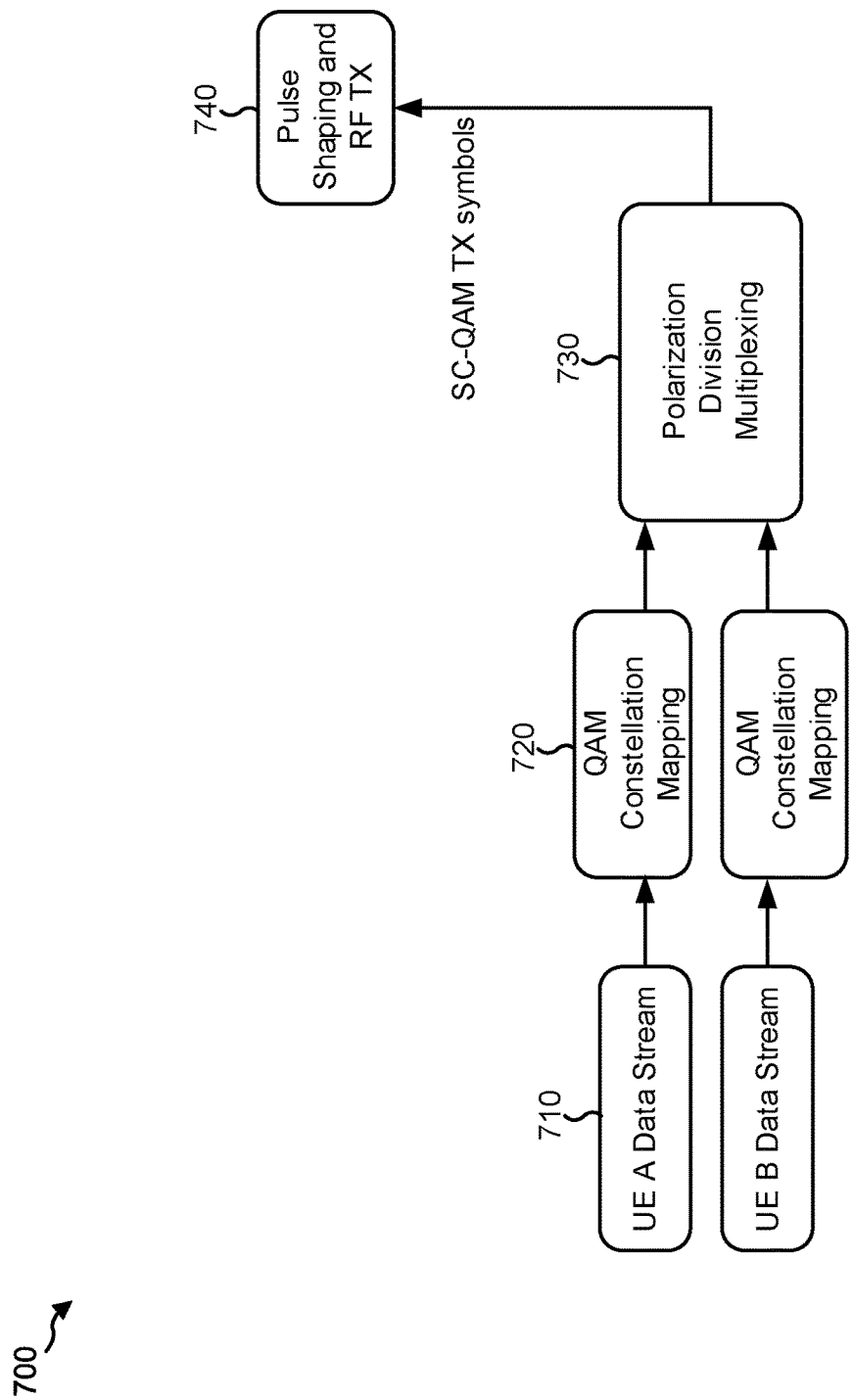
FIG. 7 is a diagram illustrating an example of polarization division multiplexing for wireless communications, in accordance with various aspects of the present disclosure.

FIG. 7 is a diagram illustrating an example 700 of polarization division multiplexing for wireless communications, in accordance with various aspects of the present disclosure. For the purpose of FIG. 7, assume that the operations of example 700 are performed by a transmitter device (e.g., a BS 110). In some aspects, another device (e.g., UE 120) may perform one or more (or all) of the operations shown in example 700.

As shown in FIG. 7, and by reference number 710, the transmitter device may receive or generate a data stream associated with a UE A (e.g., a recipient device such as UE 120) and a data stream associated with a UE B (e.g., another recipient device). In some aspects, the data streams may be received from a higher layer of the transmitter device (e.g., after processing of the data streams), from an external source, and/or the like. As shown by reference number 720, the transmitter device may perform QAM modulation of the data stream associated with the UE A and the data stream associated with the UE B. For example, the transmitter device may map each data stream to a respective QAM constellation to generate QAM symbols and/or to generate modulated data streams corresponding to the data streams. Aspects described herein are not limited to those in which the data streams are directed to UEs.

As shown by reference number 730, the transmitter device may perform polarization division multiplexing of the modulated data streams. To perform polarization division multiplexing, the transmitter device may transmit each modulated data stream according to a different polarization pattern. For example, the transmitter device may transmit a first modulated data stream using a first polarized antenna of the transmitter device, and may transmit a second modulated data stream using a second polarized antenna of the transmitter device that is associated with a different polarization pattern than the first polarized antenna. In some aspects, the transmitter device may perform polarization division multiplexing based at least in part on capabilities of a recipient device such as a UE 120. For example, the transmitter device may identify a polarization pattern that a recipient device is capable of receiving, and may use the identified polarization pattern to transmit a data stream for the recipient device. As shown by reference number 740, the transmitter device may perform pulse shaping and/or may transmit RF signals including the multiplexed signal.

In some aspects, the transmitter device may transmit data streams for multiple, different UEs using a single polarization pattern. In such a case, the transmitter device may use superposition coding to multiplex the data streams for the multiple, different UEs. For example, the transmitter device may use a first level of superposition for a first data stream of a first recipient device (e.g., UE 120), and may use a second level of superposition for a second data stream of a second recipient device. In such a case, the transmitter device may assign the first level and/or second level based at least in part on the data streams and/or the recipient devices. For example, the transmitter device may assign a more resilient level for a higher-priority data stream, may assign a level with a higher data rate for a higher-bandwidth data stream, and/or the like.

In some aspects, the transmitter device may perform polarization division multiplexing for at least two data streams (e.g., 3 data streams, 4 data streams, 5 data streams, 6 data streams, etc.). For example, the transmitter device may use a different polarization pattern for each data stream of the at least two data streams. Additionally, or alternatively, the transmitter device may use superposition coding to multiplex two or more data streams within the same polarization pattern. In this way, data for multiple different data streams may be multiplexed within a single polarization pattern or using multiple, different polarization patterns. Furthermore, by multiplexing the data streams using polarization division multiplexing (e.g., in comparison to OFDM), the transmitter device preserves the single carrier properties of the waveform.

As indicated above, FIG. 7 is provided as an example. Other examples are possible and may differ from what was described with respect to FIG. 7.

Figure 8:
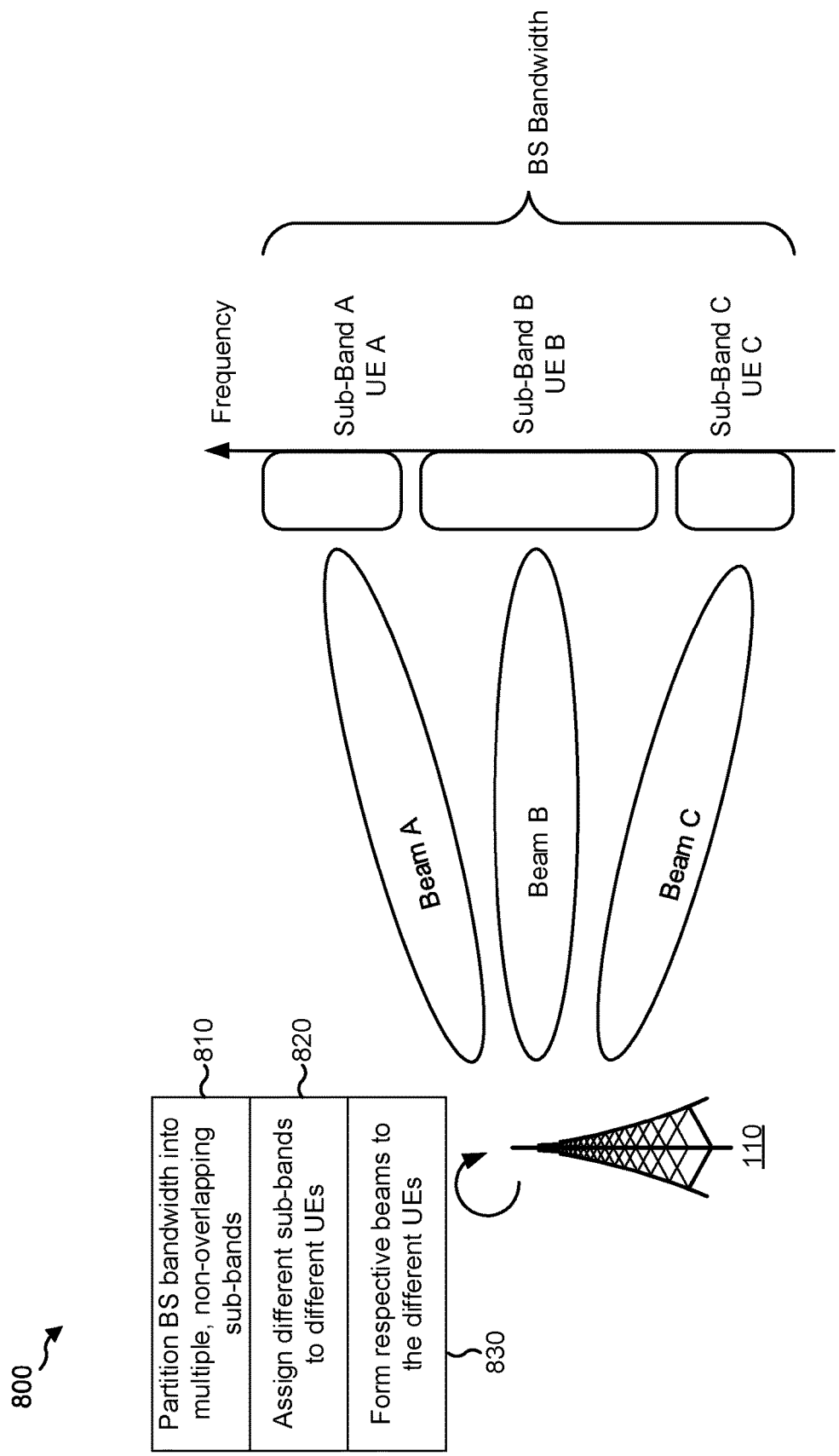
FIG. 8 is a diagram illustrating an example of frequency division multiplexing (FDM) using UE-specific beamforming, in accordance with various aspects of the present disclosure.

FIG. 8 is a diagram illustrating an example 800 of FDM using UE-specific beamforming, in accordance with various aspects of the present disclosure. For the purpose of FIG. 8, assume that the operations of example 800 are performed by a transmitter device (e.g., a BS 110). In some aspects, another device (e.g., UE 120) may perform one or more (or all) of the operations shown in example 800.

As shown in FIG. 8, and by reference number 810, a transmitter device may partition a bandwidth of the transmitter device into multiple, non-overlapping sub-bands. In FIG. 8, the transmitter device partitions the bandwidth into a sub-band A, a sub-band B, and a sub-band C, which do not overlap each other. For example, the transmitter device may partition the bandwidth into the sub-bands to form respective UE-specific beams to recipient devices for communication within the sub-bands. In some aspects, the sub-bands may include less than the bandwidth of the transmitter device. As used herein, the bandwidth of the transmitter device may refer to a bandwidth of a downlink communication channel of the transmitter device. In some aspects, the sub-bands may not overlap. In some aspects, the sub-bands may be separated by a guard band or a similar spacing.

In some aspects, the transmitter device may partition the bandwidth based at least in part on capabilities or configuration of a recipient device (e.g., UE 120). For example, a UE (e.g., low-end UEs, machine-type communication (MTC) UEs, etc.) may not have the capability to access an entire bandwidth of a downlink communication channel of the transmitter device. In such a case, the transmitter device may partition the bandwidth of the downlink communication channel so that the UE can use a portion of the bandwidth that the UE is capable of using. The transmitter device may then assign other portions of the bandwidth for other UEs, and may form UE-specific beams to the UE and the other UEs, which reduces spillover and interference between downlink signals associated with the UE and downlink signals associated with the other UEs.

As shown by reference number 820, the transmitter device may assign the different, non-overlapping sub-bands to different recipient devices. For example, the transmitter device may assign each sub-band to a respective recipient device based at least in part on bandwidth capabilities of the recipient devices. In FIG. 8, the transmitter device assigns sub-band A to a UE A, sub-band B to a UE B, and sub-band C to a UE C.

As shown by reference number 830, the transmitter device may form respective UE-specific beams to the different recipient devices. For example, each UE-specific beam may be confined to the sub-band assigned to the recipient device to which each UE-specific beam is directed. In this way, interference between the sub-bands is reduced. This may be particularly advantageous for recipient devices that are not configured to or capable of using an entire system bandwidth.

As indicated above, FIG. 8 is provided as an example. Other examples are possible and may differ from what was described with respect to FIG. 8.

Figure 9:
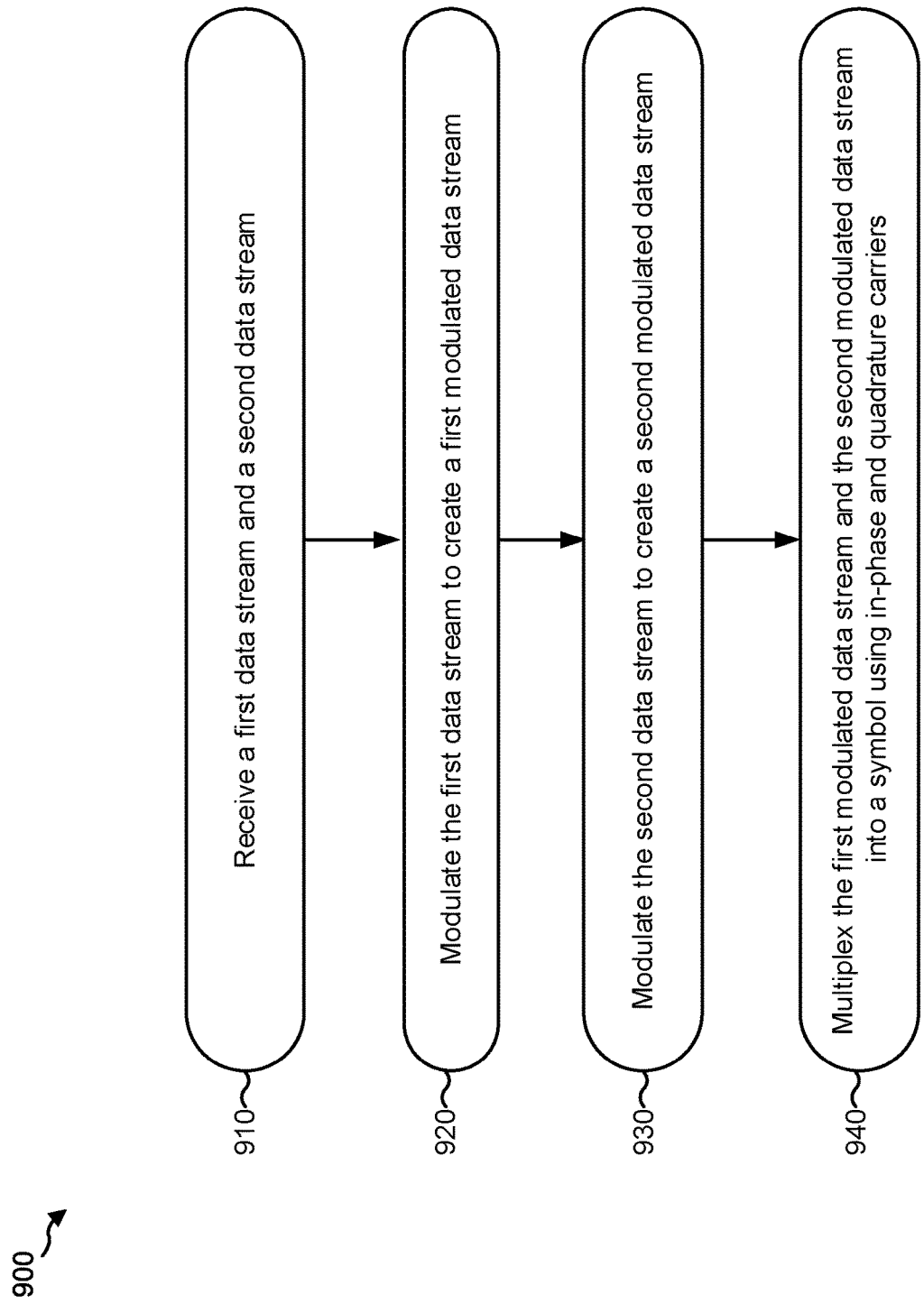
FIG. 9 is a diagram illustrating an example process performed, for example, by a base station, in accordance with various aspects of the present disclosure.

FIG. 9 is a diagram illustrating an example process 900 performed, for example, by a transmitter device, in accordance with various aspects of the present disclosure. Example process 900 is an example where a transmitter device (e.g., BS 110) performs in-phase/quadrature multiplexing.

As shown in FIG. 9, in some aspects, process 900 may include receiving a first data stream and a second data stream (block 910). For example, the transmitter device (e.g., using antenna 234, DEMOD 232, MIMO detector 236, receive processor 238, controller/processor 240, and/or the like) may receive a first data stream and a second data stream. The transmitter device may receive the first data stream and the second data stream to multiplex the first data stream and the second data stream using I/Q multiplexing, as described in more detail elsewhere herein. In some aspects, the first data stream and/or the second data stream may be received from a higher layer of the transmitter device (e.g., after processing of the first data stream and/or the second data stream), from an external source, and/or the like.

As shown in FIG. 9, in some aspects, process 900 may include modulating the first data stream to create a first modulated data stream (block 920), and modulating the second data stream to create a second modulated data stream (block 930). For example, the transmitter device (e.g., using controller/processor 240 and/or the like) may modulate the first data stream and the second data stream. In some aspects, the transmitter device may insert UE-specific signatures corresponding to recipient devices associated with the first data stream and the second data stream, which enables identification of the first modulated data stream and the second modulated data stream.

As shown in FIG. 9, in some aspects, process 900 may include multiplexing the first modulated data stream and the second modulated data stream into a symbol using in-phase and quadrature carriers (block 940). For example, the transmitter device (e.g., using controller/processor 240, transmit processor 220, TX MIMO processor 230, MOD 232, antenna 234, and/or the like) may multiplex the first modulated data stream and the second modulated data stream. The transmitter device may multiplex the first modulated data stream using an in-phase carrier, and may multiplex the second modulated data stream using a quadrature carrier. By multiplexing the data streams using I/Q multiplexing, the transmitter device preserves the SC properties of the SC waveform.

With respect to process 900, in some aspects, process 900 may include additional aspects, such as any single aspect or any combination of aspects described below and/or in connection with one or more other processes described elsewhere herein.

In some aspects, the transmitter device is further configured to add a first signature to the first data stream and a second signature to the second data stream, wherein the first signature and the second signature are added for identification of a destination of the first data stream and the second data stream by at least one decoding device. In some aspects, the first signature and the second signature are added after channel coding of the first data stream and the second data stream. In some aspects, the first signature and the second signature are added after channel coding of the first data stream and the second data stream. In some aspects, the modulation is amplitude modulation. In some aspects, the first data stream is associated with a first recipient device and the second data stream is associated with a second recipient device. In some aspects, the first data stream is associated with a first recipient device and a second recipient device, and time division multiplexing is used to multiplex symbols associated with the first recipient device and the second recipient device for transmission.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
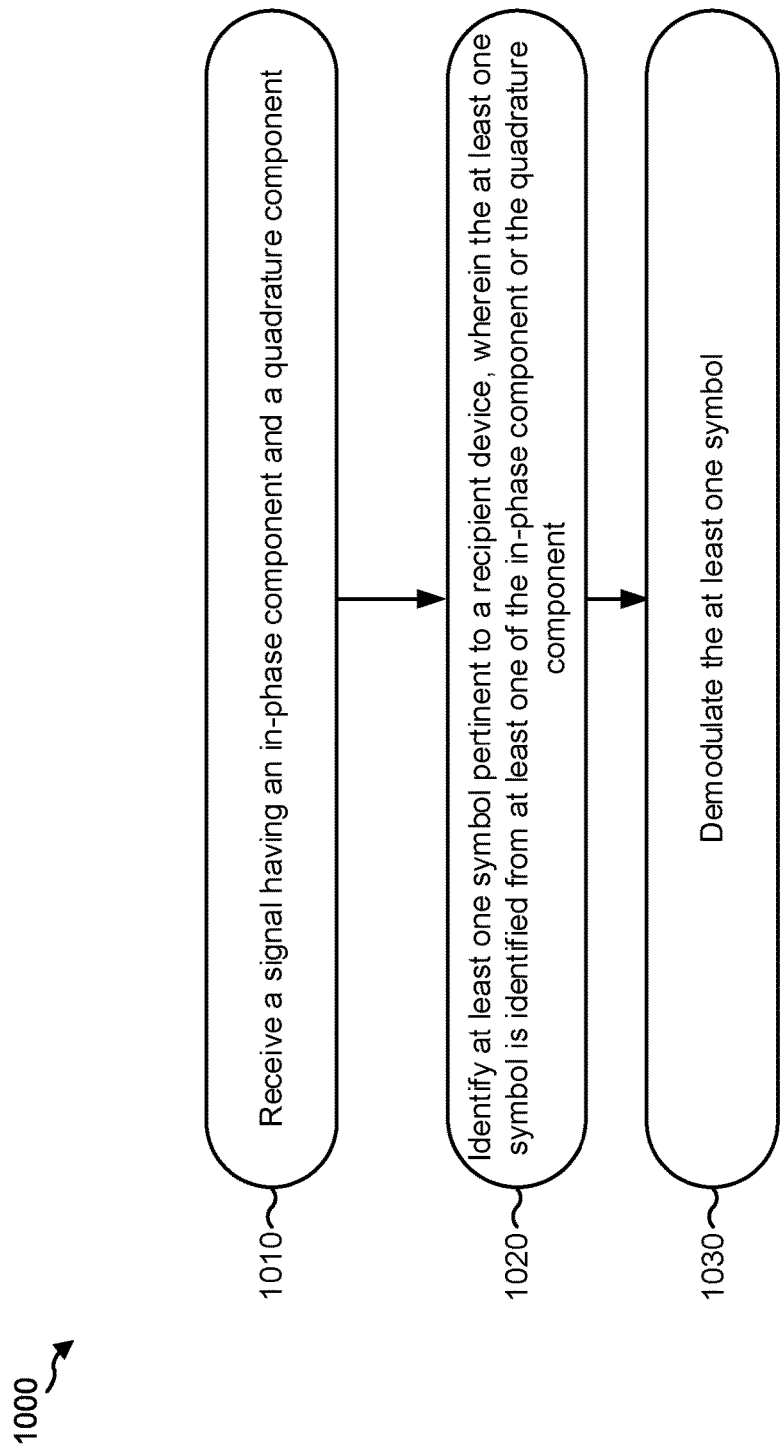
FIG. 10 is a diagram illustrating an example process performed, for example, by a wireless communication device, in accordance with various aspects of the present disclosure.

FIG. 10 is a diagram illustrating an example process 1000 performed, for example, by a recipient device, in accordance with various aspects of the present disclosure. Example process 1000 is an example where a recipient device (e.g., a wireless communication device such as UE 120) communicates using I/Q multiplexing.

As shown in FIG. 10, in some aspects, process 1000 may include receiving a signal having an in-phase component and a quadrature component (block 1010). For example, the recipient device (e.g., using antenna 252, DEMOD 254, MIMO detector 256, receive processor 258, controller/processor 280, and/or the like) may receive a signal having an in-phase component and a quadrature component. In some aspects, the signal may be generated based at least in part on process 900, described above.

As shown in FIG. 10, in some aspects, process 1000 may include identifying at least one symbol pertinent to the recipient device, wherein the at least one symbol is identified from at least one of the in-phase component or the quadrature component (block 1020). For example, the recipient device (e.g., using controller/processor 280 and/or the like) may identify at least one symbol of the signal that is pertinent to the recipient device. In some aspects, the recipient device may identify the at least one symbol based at least in part on a UE-specific signature included in the at least one symbol. The at least one symbol may be identified from at least one of the in-phase component or the quadrature component (e.g., based at least in part on whether a data stream associated with the at least one symbol is modulated using the in-phase carrier or the quadrature carrier).

As shown in FIG. 10, in some aspects, process 1000 may include demodulating the at least one symbol (block 1030). For example, the recipient device (e.g., using DEMOD 254, MIMO detector 256, receive processor 258, controller/processor 280, and/or the like) may demodulate the at least one symbol to obtain a data stream associated with the recipient device. In some aspects, the at least one symbol is identified based at least in part on the at least one symbol being received on the one of the in-phase component or the quadrature component. In some aspects, the at least one symbol is identified based at least in part on a signature, specific to the recipient device, associated with the at least one symbol. In some aspects, the at least one symbol is identified from a plurality of symbols on the one of the in-phase component or the quadrature component, wherein the at least one symbol is time division multiplexed with the plurality of symbols.

With respect to process 1000, in some aspects, process 1000 may include additional aspects, such as any single aspect or any combination of aspects described above and/or in connection with one or more other processes described elsewhere herein.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
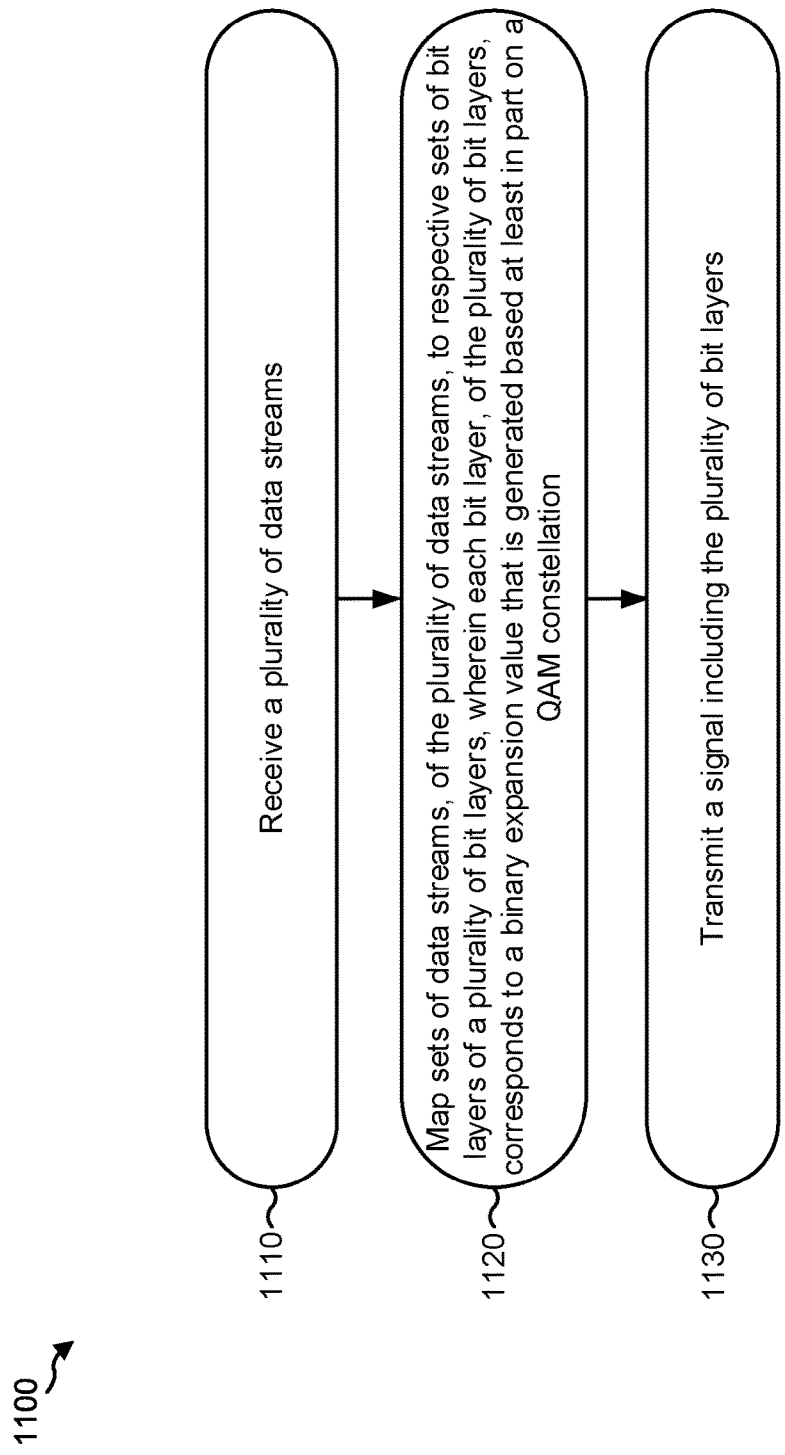
FIG. 11 is a diagram illustrating an example process performed, for example, by a base station, in accordance with various aspects of the present disclosure.

FIG. 11 is a diagram illustrating an example process 1100 performed, for example, by a transmitter device, in accordance with various aspects of the present disclosure. Example process 1100 is an example where a transmitter device (e.g., BS 110) performs superposition QAM based at least in part on layered bit mapping.

As shown in FIG. 11, in some aspects, process 1100 may include receiving a plurality of data streams (block 1110). For example, the transmitter device (e.g., using antenna 234, DEMOD 232, MIMO detector 236, receive processor 238, controller/processor 240, and/or the like) may receive a plurality of data streams. The plurality of data streams may be associated with at least one recipient device. The transmitter device may receive the plurality of data streams to multiplex the plurality of data streams using bit layers of a layered QAM constellation. In some aspects, the plurality of data streams may be received from a higher layer of the transmitter device (e.g., after processing of the plurality of first data stream and/or the second data stream), from an external source, and/or the like.

As shown in FIG. 11, in some aspects, process 1100 may include mapping sets of data streams, of the plurality of data streams, to respective sets of bit layers of a plurality of bit layers, wherein each bit layer, of the plurality of bit layers, corresponds to a binary expansion value that is generated based at least in part on a QAM constellation (block 1120). For example, the transmitter device (e.g., using controller/processor 240 and/or the like) may map sets of data streams, of the plurality of data streams, to respective sets of bit layers of a plurality of bit layers. The bit layers may correspond to binary expansion values that are generated based at least in part on a QAM constellation, such as a layered QAM constellation.

As shown in FIG. 11, in some aspects, process 1100 may include transmitting a signal including the plurality of bit layers (block 1130). For example, the transmitter device may transmit a signal including the plurality of bit layers. In some aspects, the transmitter device may determine symbols using the QAM constellation and based at least in part on mapping the data streams to the bit layers, and may transmit a signal identifying the symbols.

With respect to process 1100, in some aspects, process 1100 may include additional aspects, such as any single aspect or any combination of aspects described below and/or in connection with one or more other processes described elsewhere herein.

In some aspects, the plurality of bit layers is associated with a plurality of corresponding transmission power levels, and the respective sets of bit layers are assigned to one or more entities based at least in part on corresponding transmission power levels, of the plurality of corresponding transmission power levels, associated with the respective sets of bit layers. In some aspects, the transmitter device may assign the respective sets of bit layers to one or more entities associated with the plurality of data streams. In some aspects, the respective sets of bit layers are assigned based at least in part on channel feedback associated with the one or more entities. In some aspects, the respective sets of bit layers are assigned based at least in part on one or more quality of service requirements associated with the one or more entities. In some aspects, the respective sets of bit layers are associated with respective reliability levels and the respective sets of bit layers are assigned based at least in part on the respective reliability levels. In some aspects, the respective sets of bit layers are assigned based at least in part on a utility function or a throughput maximization function. In some aspects, the respective sets of bit layers are assigned based at least in part on an error protection requirement or a priority class associated with the one or more entities. In some aspects, the transmitter device is configured to determine at least one channel coding level for at least one data stream, of the plurality of data streams, based at least in part on the error protection requirement or the priority class. In some aspects, a particular bit layer, associated with a highest reliability level or transmission power level, is assigned for a particular data stream, of the plurality of data streams, associated with control data. In some aspects, a first set of bit layers, of the plurality of bit layers, is assigned to a first recipient device and a second set of bit layers, of the plurality of bit layers, is assigned to a second recipient device, wherein the first set of bit layers has a different quantity of bit layers than the second set of bit layers.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
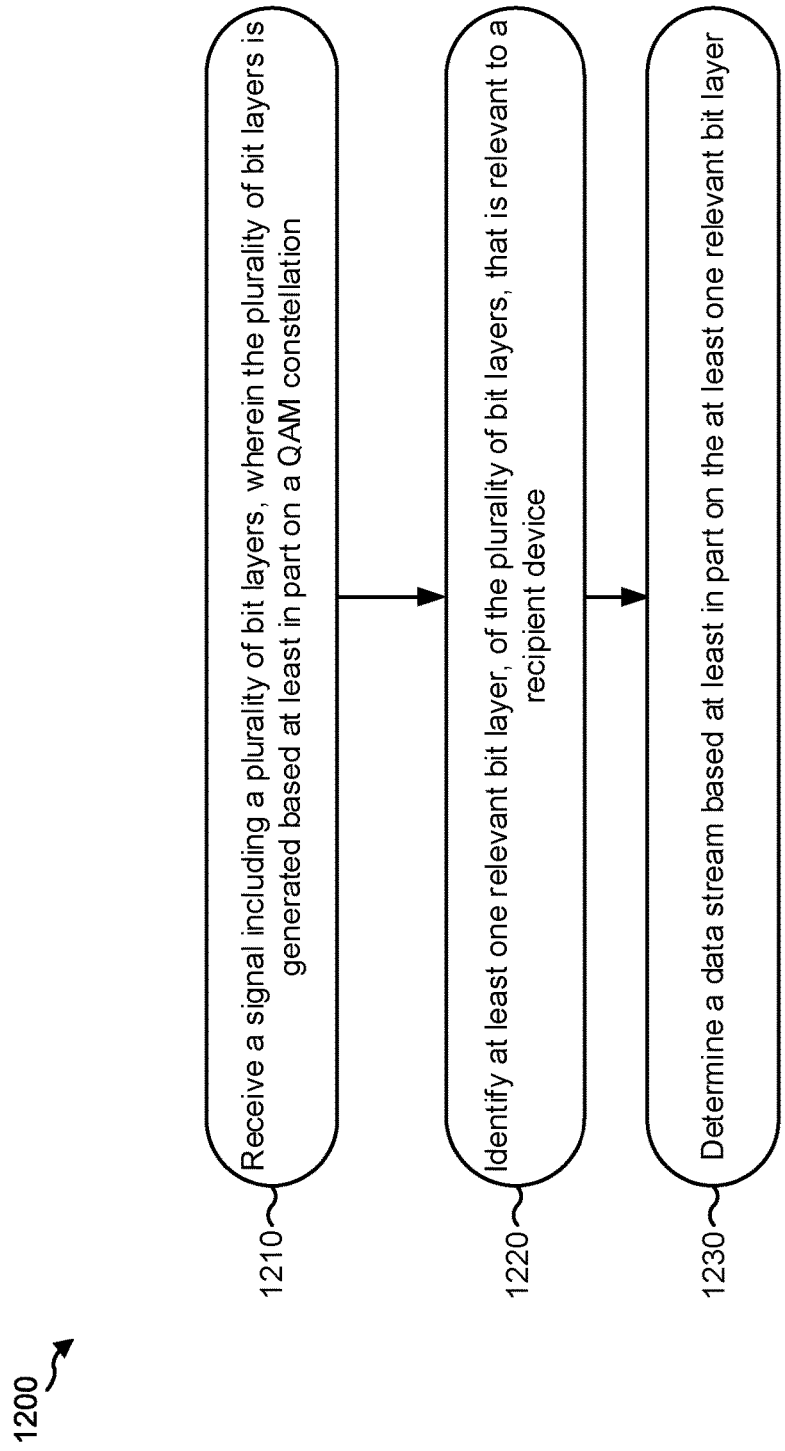
FIG. 12 is a diagram illustrating an example process performed, for example, by a wireless communication device, in accordance with various aspects of the present disclosure.

FIG. 12 is a diagram illustrating an example process 1200 performed, for example, by a recipient device, in accordance with various aspects of the present disclosure. Example process 1200 is an example where a recipient device (e.g., a wireless communication device such as UE 120) communicates using superposition QAM based at least in part on layered bit mapping.

As shown in FIG. 12, in some aspects, process 1200 may include receiving a signal including a plurality of bit layers, wherein the plurality of bit layers is generated based at least in part on a QAM constellation (block 1210). For example, the recipient device (e.g., using antenna 252, DEMOD 254, MIMO detector 256, receive processor 258, controller/processor 280, and/or the like) may receive a signal. The signal may include a plurality of bit layers. The plurality of bit layers may be generated based at least in part on a QAM constellation. For example, the signal may include symbols that are generated according to a bit layer of the QAM constellation that is assigned to the wireless communication device.

As shown in FIG. 12, in some aspects, process 1200 may include identifying at least one relevant bit layer, of the plurality of bit layers, that is relevant to the wireless communication device (block 1220). For example, the recipient device (e.g., using controller/processor 280 and/or the like) may identify at least one relevant bit layer that is relevant to the recipient device. In some aspects, the recipient device may identify the relevant bit layer based at least in part on information included in the relevant bit layer (e.g., a UE identifier and/or the like). In some aspects, the recipient device may identify the relevant bit layer based at least in part on scheduling information indicating that the relevant bit layer is pertinent to the recipient device.

As shown in FIG. 12, in some aspects, process 1200 may include determining a data stream based at least in part on the at least one relevant bit layer (block 1230). For example, the recipient device (e.g., using controller/processor 280 and/or the like) may determine a data stream based at least in part on the at least one relevant bit layer. In some aspects, the recipient device may determine a data stream based at least in part on multiple relevant bit layers (e.g., when multiple bit layers are assigned to the wireless communication device).

With respect to process 1200, in some aspects, process 1200 may include additional aspects, such as any single aspect or any combination of aspects described below and/or in connection with one or more other processes described elsewhere herein.

In some aspects, the at least one relevant bit layer is identified based at least in part on a transmission power level of the at least one relevant bit layer. In some aspects, the at least one relevant bit layer includes at least two bit layers that are not adjacent to each other. In some aspects, the at least one bit layer is assigned based at least in part on a quality of service requirement, a priority class, or an error protection requirement of the recipient device.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
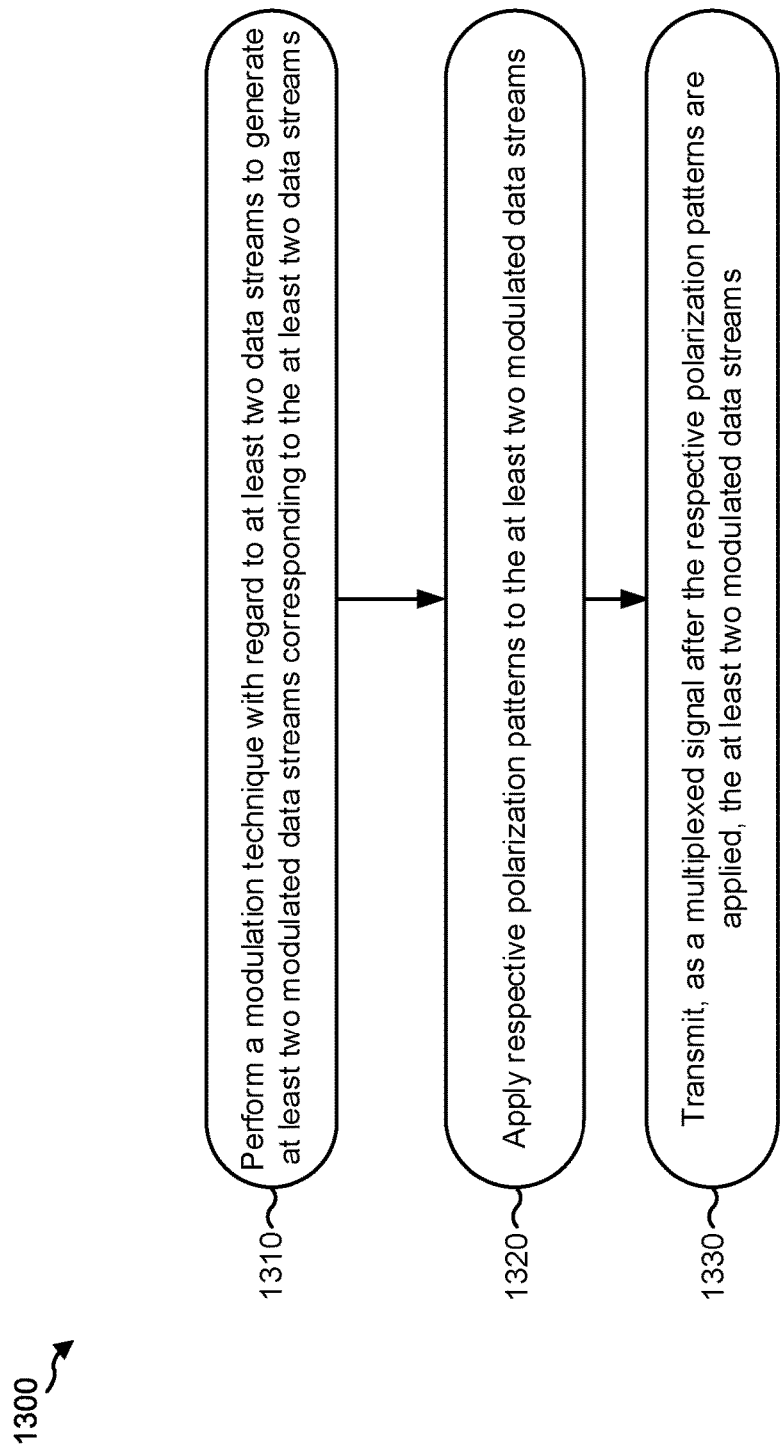
FIG. 13 is a diagram illustrating an example process performed, for example, by a base station, in accordance with various aspects of the present disclosure.

FIG. 13 is a diagram illustrating an example process 1300 performed, for example, by a transmitter device, in accordance with various aspects of the present disclosure. Example process 1300 is an example where a transmitter device (e.g., BS 110) performs polarization division multiplexing for wireless communications.

As shown in FIG. 13, in some aspects, process 1300 may include performing a modulation technique with regard to at least two data streams to generate at least two modulated data streams corresponding to the at least two data streams (block 1310). For example, the transmitter device (e.g., using controller/processor 240, transmit processor 220, TX MIMO processor 230, MOD 232, antenna 234, and/or the like) may perform a modulation technique with regard to at least two data streams. In some aspects, the at least two data streams may be destined to respective recipient devices (e.g., wireless communication devices such as UE 120). In some aspects, the modulation technique may include a QAM technique and/or the like. The transmitter device may perform the modulation technique to generate at least two modulated data streams, using the at least two data streams, for multiplexing using polarization division multiplexing. In some aspects, the at least two data streams may be received from a higher layer of the transmitter device (e.g., after processing of the at least two data streams), from an external source, and/or the like.

As shown in FIG. 13, in some aspects, process 1300 may include applying respective polarization patterns to the at least two modulated data streams (block 1320). For example, the transmitter device (e.g., using controller/processor 240, transmit processor 220, TX MIMO processor 230, MOD 232, antenna 234, and/or the like) may apply respective polarization patterns to the at least two modulated data streams. In some aspects, the transmitter device may select the respective polarization patterns for application to the at least two modulated data streams (e.g., based at least in part on capabilities of recipient devices of the at least two modulated data streams and/or the like). Additionally, or alternatively, the transmitter device may identify particular polarized antennas to transmit the at least two modulated data streams so that the respective polarization patterns are applied.

As shown in FIG. 13, in some aspects, process 1300 may include transmitting, as a multiplexed signal after the respective polarization patterns are applied, the at least two modulated data streams (block 1330). For example, the transmitter device (e.g., using controller/processor 240, transmit processor 220, TX MIMO processor 230, MOD 232, antenna 234, and/or the like) may transmit the at least two modulated data streams as a multiplexed signal after the respective polarization patterns are applied. In some aspects, the transmission of the at least two modulated data streams may apply the respective polarization patterns. For example, the transmitter device may use polarized antennas associated with the respective polarization patterns to transmit the at least two modulated data streams.

With respect to process 1300, in some aspects, process 1300 may include additional aspects, such as any single aspect or any combination of aspects described below and/or in connection with one or more other processes described elsewhere herein.

In some aspects, the modulation technique is a quadrature amplitude modulation technique. In some aspects, a particular data stream, of the at least two data streams, includes multiplexed data for multiple, different wireless communication devices. In some aspects, the multiplexed data is multiplexed based at least in part on at least one of a superposition quadrature amplitude modulation technique using layered bit mapping or an in-phase/quadrature multiplexing technique. In some aspects, the respective polarization patterns are applied using respective polarized antennas of the transmitter device.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
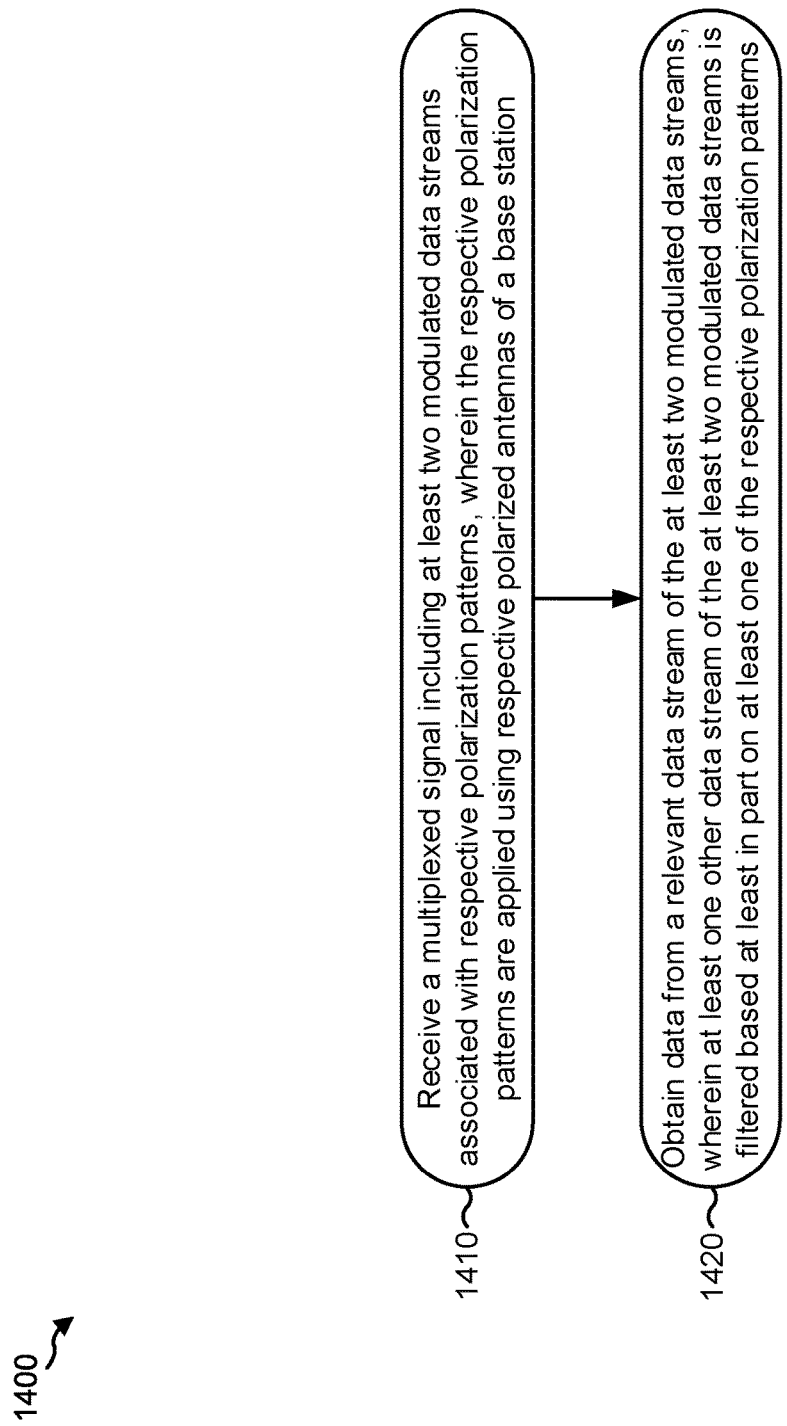
FIG. 14 is a diagram illustrating an example process performed, for example, by a wireless communication device, in accordance with various aspects of the present disclosure.

FIG. 14 is a diagram illustrating an example process 1400 performed, for example, by a recipient device, in accordance with various aspects of the present disclosure. Example process 1400 is an example where a recipient device (e.g., a wireless communication device such as UE 120) communicates using polarization division multiplexing for wireless communications.

As shown in FIG. 14, in some aspects, process 1400 may include receiving a multiplexed signal including at least two modulated data streams associated with respective polarization patterns, wherein the respective polarization patterns are applied using respective polarized antennas of a base station (block 1410). For example, the recipient device (e.g., using antenna 252, DEMOD 254, MIMO detector 256, receive processor 258, controller/processor 280, and/or the like) may receive a multiplexed signal. The multiplexed signal may include at least two modulated data streams that are associated with respective polarization patterns. The respective polarization patterns may be applied using respective polarized antennas of a transmitter device that transmitted the multiplexed signal.

As shown in FIG. 14, in some aspects, process 1400 may include obtaining data from a relevant data stream of the at least two modulated data streams, wherein at least one other data stream of the at least two modulated data streams is filtered based at least in part on at least one of the respective polarization patterns (block 1420). For example, the recipient device (e.g., using antenna 252, DEMOD 254, MIMO detector 256, receive processor 258, controller/processor 280, and/or the like) may obtain data from a relevant data stream of the at least two modulated data stream. To obtain the data, the recipient device may filter at least one other data stream of the at least two modulated data streams based at least in part on at least one of the respective polarization patterns. This filtering may be active (e.g., when the recipient device has a receiver antenna capable of selectively filtering polarization patterns) or passive. For example, the recipient device may only be capable of receiving a particular polarization pattern associated with the relevant data stream.

With respect to process 1400, in some aspects, process 1400 may include additional aspects, such as any single aspect or any combination of aspects described below and/or in connection with one or more other processes described elsewhere herein.

In some aspects, the at least two modulated data streams are modulated using quadrature amplitude modulation. In some aspects, the relevant data stream includes multiplexed data for multiple, different recipient devices including the recipient device, and the recipient device is configured to extract the relevant data stream from the multiplexed data. In some aspects, the multiplexed data is multiplexed based at least in part on at least one of a superposition quadrature amplitude modulation technique using layered bit mapping or an in-phase/quadrature multiplexing technique.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
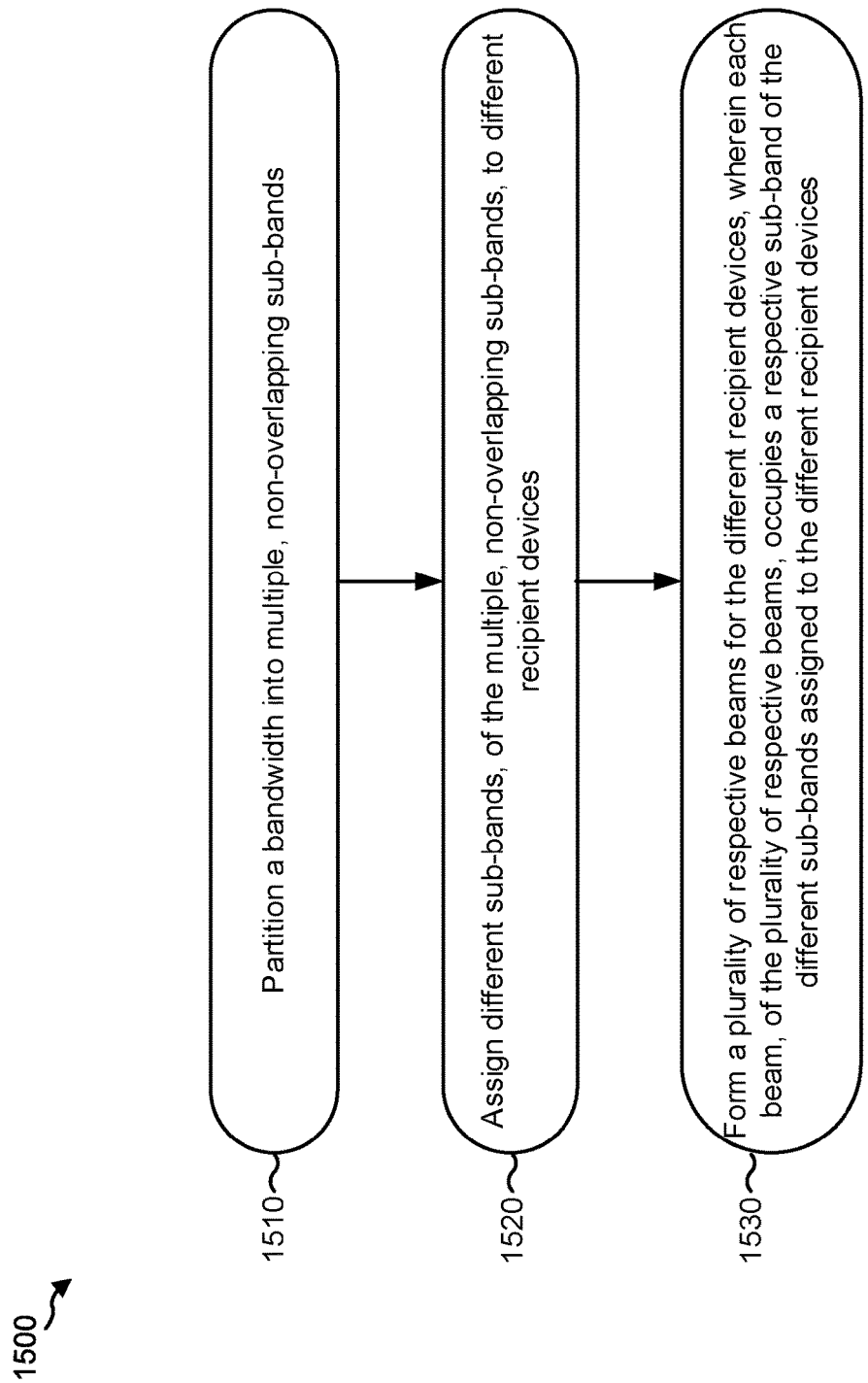
FIG. 15 is a diagram illustrating an example process performed, for example, by a base station, in accordance with various aspects of the present disclosure.

FIG. 15 is a diagram illustrating an example process 1500 performed, for example, by a transmitter device, in accordance with various aspects of the present disclosure. Example process 1500 is an example where a transmitter device (e.g., BS 110) performs FDM using UE-specific beamforming.

As shown in FIG. 15, in some aspects, process 1500 may include partitioning a bandwidth into multiple, non-overlapping sub-bands (block 1510). For example, the transmitter device (e.g., using controller/processor 240 and/or the like) may partition a bandwidth into multiple, non-overlapping sub-bands. In some aspects, the bandwidth may correspond to a bandwidth of a downlink channel of the transmitter device. In some aspects, the multiple, non-overlapping sub-bands may be separated from each other by guard bands and/or the like. In some aspects, another device, such as a network controller, may partition the bandwidth. In some aspects, the partitioning of the bandwidth may be specified in a standard or technical specification.

As shown in FIG. 15, in some aspects, process 1500 may include assigning different sub-bands, of the multiple, non-overlapping sub-bands, to different wireless communication devices (block 1520). For example, the transmitter device (e.g., using controller/processor 240 and/or the like) may assign different sub-bands to different (e.g., respective) recipient devices. In some aspects, the transmitter device may assign the different sub-bands based at least in part on bandwidth capabilities of the recipient devices. For example, the transmitter device may assign each sub-band to a corresponding recipient device associated with a compatible bandwidth capability.

As shown in FIG. 15, in some aspects, process 1500 may include forming a plurality of respective beams for the different recipient devices, wherein each beam, of the plurality of respective beams, occupies a respective sub-band of the different sub-bands assigned to the different recipient devices (block 1530). For example, the transmitter device (e.g., using controller/processor 240, transmit processor 220, TX MIMO processor 230, MOD 232, antenna 234, and/or the like) may form a UE-specific beam for each recipient device that is assigned a sub-band. The UE-specific beams may occupy the corresponding sub-bands. In this way, the transmitter device reduces interference between downlink communications to the different wireless communication devices.

With respect to process 1500, in some aspects, process 1500 may include additional aspects, such as any single aspect or any combination of aspects described below and/or in connection with one or more other processes described elsewhere herein.

In some aspects, a sub-band, of the different sub-bands, assigned to a particular recipient device, of the different recipient devices, corresponds to a maximum bandwidth capability of the particular recipient device. In some aspects, the plurality of respective beams are formed using user equipment-specific beamforming.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

Figure 16:
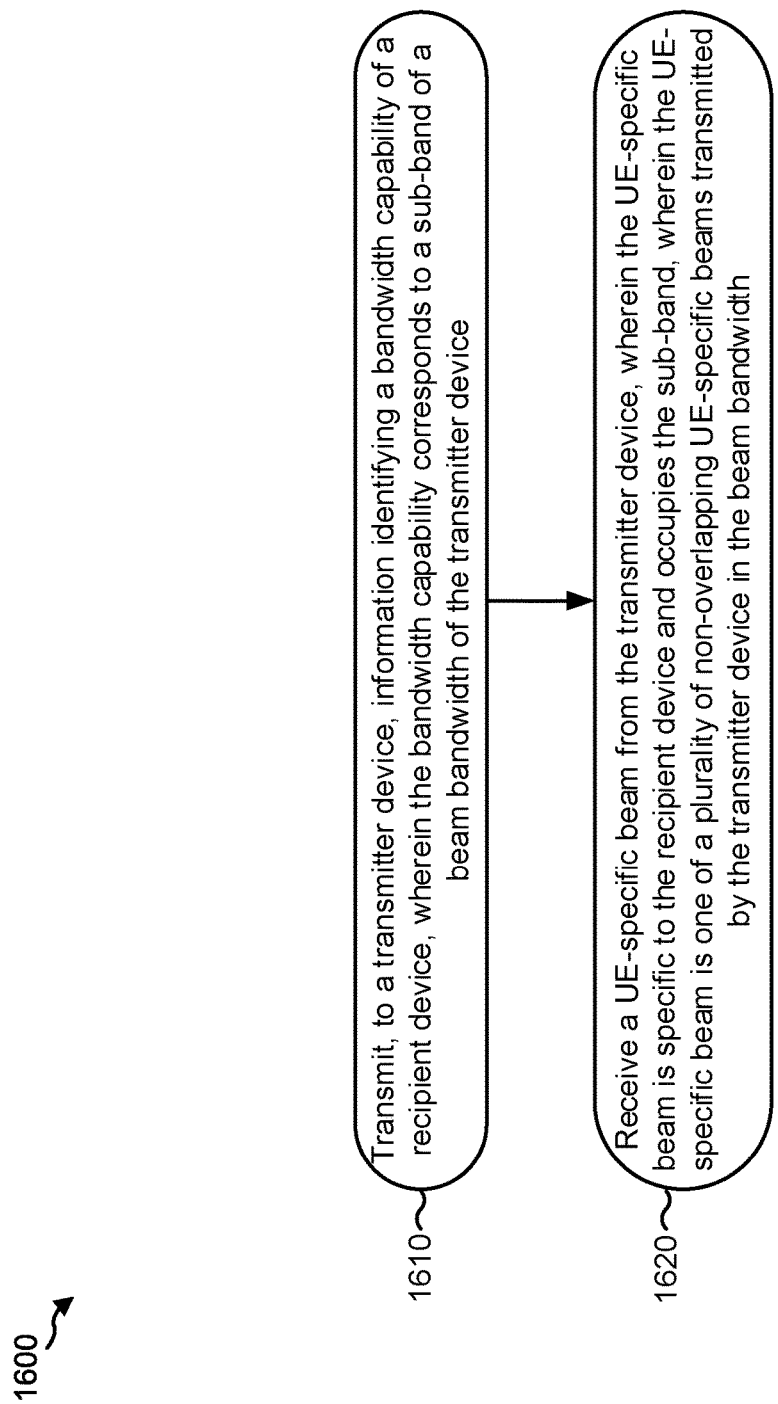
FIG. 16 is a diagram illustrating an example process performed, for example, by a wireless communication device, in accordance with various aspects of the present disclosure.

FIG. 16 is a diagram illustrating an example process 1600 performed, for example, by a recipient device, in accordance with various aspects of the present disclosure. Example process 1600 is an example where a recipient device (e.g., a recipient device such as UE 120) performs FDM using UE-specific beamforming.

As shown in FIG. 16, in some aspects, process 1600 may include transmitting, to a transmitter device, information identifying a bandwidth capability of the recipient device, wherein the bandwidth capability corresponds to a sub-band of a beam bandwidth of the transmitter device (block 1610). For example, a recipient device (e.g., using controller/processor 280, transmit processor 264, TX MIMO processor 266, MOD 254, antenna 252, and/or the like) may transmit information identifying a bandwidth capability of the recipient device to a transmitter device. The recipient device may transmit the information so that the transmitter device can partition a sub-band of a bandwidth associated with the transmitter device for communication with the recipient device. For example, the bandwidth capability may correspond to the sub-band of the bandwidth.

As shown in FIG. 16, in some aspects, process 1600 may include receiving a user equipment-specific beam from the base station, wherein the user equipment-specific beam is specific to the recipient device and occupies the sub-band, wherein the user equipment-specific beam is one of a plurality of non-overlapping user equipment-specific beams transmitted by the transmitter device in the beam bandwidth (block 1620). For example, the recipient device (e.g., using antenna 252, DEMOD 254, MIMO detector 256, receive processor 258, controller/processor 280, and/or the like) may receive a UE-specific beam from the transmitter device. The UE-specific beam may be specific to the recipient device, and may occupy the sub-band of the bandwidth associated with the recipient device. For example, the UE-specific beam may be one of a plurality of non-overlapping (in frequency) UE-specific beams transmitted by the transmitter device within the beam bandwidth. The recipient device may communicate based at least in part on information received in the UE-specific beam.

With respect to process 1600, in some aspects, process 1600 may include additional aspects, such as any single aspect or any combination of aspects described above and/or in connection with one or more other processes described elsewhere herein.

Although FIG. 16 shows example blocks of process 1600, in some aspects, process 1600 may include additional blocks, fewer blocks, different blocks, or differently arranged blocks than those depicted in FIG. 16. Additionally, or alternatively, two or more of the blocks of process 1600 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a transmitter device, comprising:
   partitioning a bandwidth into multiple, non-overlapping sub-bands, wherein the multiple, non-overlapping sub-bands include a first sub-band and a second sub-band, and wherein the first sub-band and the second sub-band are separated by a guard band or another type of spacing;

assigning different sub-bands, of the multiple, non-overlapping sub-bands, to different recipient devices, wherein a sub-band, of the different sub-bands, assigned to a particular recipient device, of the different recipient devices, corresponds to a bandwidth capability of the particular recipient device; and forming a plurality of respective beams for the different recipient devices, wherein each beam, of the plurality of respective beams, occupies a respective sub-band of the different sub-bands assigned to the different recipient devices.

2. The method of claim 1, wherein the plurality of respective beams are formed using recipient device-specific beamforming.

3. The method of claim 1,
wherein the bandwidth capability of the particular recipient device is a maximum bandwidth capability of the particular recipient device, and
wherein different sub-bands are assigned based at least in part on bandwidth capabilities of the different recipient devices.

4. A method of wireless communication performed by a recipient device, comprising:
transmitting, to a transmitter device, information identifying a bandwidth capability of the recipient device, wherein the bandwidth capability corresponds to a sub-band of a beam bandwidth of the transmitter device, and wherein the bandwidth capability indicates that the recipient device does not have a capability to access an entirety of the beam bandwidth; and
receiving a recipient device-specific beam from the transmitter device,
wherein the recipient device-specific beam is specific to the recipient device and occupies the sub-band,
wherein the sub-band corresponds to a bandwidth capability of the recipient device, and
wherein the recipient device-specific beam is one of a plurality of non-overlapping recipient device-specific beams that were transmitted by the transmitter device in the beam bandwidth.

5. The method of claim 4, wherein the beam bandwidth is a bandwidth of a downlink communication channel of the transmitter device.

6. A transmitter device for wireless communication, comprising:
a memory; and
one or more processors operatively coupled to the memory, the memory and the one or more processors configured to:
partition a bandwidth into multiple, non-overlapping sub-bands, wherein the multiple, non-overlapping sub-bands include a first sub-band and a second sub-band, and wherein the first sub-band and the second sub-band are separated by a guard band or another type of spacing;
assign different sub-bands, of the multiple, non-overlapping sub-bands, to different recipient devices, wherein a sub-band, of the different sub-bands, assigned to a particular recipient device, of the different recipient devices, corresponds to a bandwidth capability of the particular recipient device; and
form a plurality of respective beams for the different recipient devices,
wherein each beam, of the plurality of respective beams, occupies a respective sub-band of the different sub-bands assigned to the different recipient devices.

7. The transmitter device of claim 6, wherein the plurality of respective beams are formed using recipient device-specific beamforming.

8. The transmitter device of claim 6, wherein the different sub-bands are assigned based at least in part on bandwidth capabilities of the different recipient devices.

9. A recipient device for wireless communication, comprising:
a memory; and
one or more processors operatively coupled to the memory, the memory and the one or more processors configured to:
transmit, to a transmitter device, information identifying a bandwidth capability of the recipient device, wherein the bandwidth capability corresponds to a sub-band of a beam bandwidth of the transmitter device, and wherein the bandwidth capability indicates that the recipient device does not have a capability to access an entirety of the beam bandwidth; and
receive a recipient device-specific beam from the transmitter device,
wherein the recipient device-specific beam is specific to the recipient device and occupies the sub-band,
wherein the sub-band corresponds to a bandwidth capability of the recipient device, and
wherein the recipient device-specific beam is one of a plurality of non-overlapping recipient device-specific beams transmitted by the transmitter device in the beam bandwidth.

10. The recipient device of claim 9, wherein the beam bandwidth is a bandwidth of a downlink communication channel of the transmitter device.

11. A non-transitory computer-readable medium storing one or more instructions for wireless communication, the one or more instructions comprising:
one or more instructions that, when executed by one or more processors of a transmitter device, cause the one or more processors to:
partition a bandwidth into multiple, non-overlapping sub-bands, wherein the multiple, non-overlapping sub-bands include a first sub-band and a second sub-band, and
wherein the first sub-band and the second sub-band are separated by a guard band or another type of spacing;
assign different sub-bands, of the multiple, non-overlapping sub-bands, to different recipient devices, wherein a sub-band, of the different sub-bands, assigned to a particular recipient device, of the different recipient devices, corresponds to a bandwidth capability of the particular recipient device; and
form a plurality of respective beams for the different recipient devices,
wherein each beam, of the plurality of respective beams, occupies a respective sub-band of the different sub-bands assigned to the different recipient devices.

12. The non-transitory computer-readable medium of claim 11, wherein the plurality of respective beams are formed using recipient device-specific beamforming.

13. The non-transitory computer-readable medium of claim 11, wherein the different sub-bands are assigned based at least in part on bandwidth capabilities of the different recipient devices.

14. A non-transitory computer-readable medium storing one or more instructions for wireless communication, the one or more instructions comprising:
  one or more instructions that, when executed by one or more processors of a recipient device, cause the one or more processors to:
    transmit, to a transmitter device, information identifying a bandwidth capability of the recipient device, wherein the bandwidth capability corresponds to a sub-band of a beam bandwidth of the transmitter device, and wherein the bandwidth capability indicates that the recipient device does not have a capability to access an entirety of the beam bandwidth; and
    receive a recipient device-specific beam from the transmitter device,
      wherein the recipient device-specific beam is specific to the recipient device and occupies the sub-band,
      wherein the sub-band corresponds to a bandwidth capability of the recipient device, and
      wherein the recipient device-specific beam is one of a plurality of non-overlapping recipient device-specific beams transmitted by the transmitter device in the beam bandwidth.

15. The non-transitory computer-readable medium of claim 14, wherein the beam bandwidth is a bandwidth of a downlink communication channel of the transmitter device.

16. An apparatus for wireless communication, comprising:
  means for partitioning a bandwidth into multiple, non-overlapping sub-bands, wherein the multiple, non-overlapping sub-bands include a first sub-band and a second sub-band, and wherein the first sub-band and the second sub-band are separated by a guard band or another type of spacing;
  means for assigning different sub-bands, of the multiple, non-overlapping sub-bands, to different recipient devices, wherein a sub-band, of the different sub-bands, assigned to a particular recipient device, of the different recipient devices, corresponds to a bandwidth capability of the particular recipient device; and
  means for forming a plurality of respective beams for the different recipient devices,
    wherein each beam, of the plurality of respective beams, occupies a respective sub-band of the different sub-bands assigned to the different recipient devices.

17. The apparatus of claim 16, wherein the plurality of respective beams are formed using recipient device-specific beamforming.

18. The apparatus of claim 16, wherein the different sub-bands are assigned based at least in part on bandwidth capabilities of the different recipient devices.

19. An apparatus for wireless communication, comprising:
  means for transmitting, to a transmitter device, information identifying a bandwidth capability of the apparatus, wherein the bandwidth capability corresponds to a sub-band of a beam bandwidth of the transmitter device, and wherein the bandwidth capability indicates that the apparatus does not have a capability to access an entirety of the beam bandwidth; and
  means for receiving a recipient device-specific beam from the transmitter device,
    wherein the recipient device-specific beam is specific to the apparatus and occupies the sub-band,
    wherein the sub-band corresponds to a bandwidth capability of the recipient device, and
    wherein the recipient device-specific beam is one of a plurality of non-overlapping recipient device-specific beams transmitted by the transmitter device in the beam bandwidth.

20. The apparatus of claim 19, wherein the beam bandwidth is a bandwidth of a downlink communication channel of the transmitter device.

* * * * *